(12) United States Patent
Prem et al.

(10) Patent No.: US 12,545,337 B2
(45) Date of Patent: Feb. 10, 2026

(54) AUTOMATED COMPENSATOR FOR FIFTH-WHEEL COUPLINGS

(71) Applicant: Mechanical System Dynamics Pty Ltd, Waterways (AU)

(72) Inventors: Hans Prem, Waterways (AU); Kinh-Luan Viet Mai, Waterways (AU)

(73) Assignee: Mechanical System Dynamics Pty Ltd, Waterways (AU)

( * ) Notice: Subject to any disclaimer, the term of this patent is extended or adjusted under 35 U.S.C. 154(b) by 770 days.

(21) Appl. No.: 17/904,705

(22) PCT Filed: Feb. 19, 2021

(86) PCT No.: PCT/AU2021/050146
§ 371 (c)(1),
(2) Date: Aug. 19, 2022

(87) PCT Pub. No.: WO2021/163765
PCT Pub. Date: Aug. 26, 2021

(65) Prior Publication Data
US 2022/0410988 A1 Dec. 29, 2022

(30) Foreign Application Priority Data

Feb. 20, 2020 (AU) ................................ 2020900481

(51) Int. Cl.
*B62D 53/08* (2006.01)
(52) U.S. Cl.
CPC ..... *B62D 53/0871* (2013.01); *B62D 53/0885* (2013.01)
(58) Field of Classification Search
CPC ............ B62D 53/0871; B62D 53/0885; B62D 53/0878
See application file for complete search history.

(56) References Cited

U.S. PATENT DOCUMENTS

| 2,565,285 A | 8/1951 | Wakeman |
| 2,833,561 A | 5/1958 | Alexandre |

(Continued)

FOREIGN PATENT DOCUMENTS

| AU | 436212 B2 | 1/1970 |
| CH | 347077 A | 6/1960 |

(Continued)

OTHER PUBLICATIONS

International Search Report and Written Opinion issued in International Application No. PCT/AU2021/050146, mailed on Mar. 26, 2021.

(Continued)

*Primary Examiner* — Valentin Neacsu
*Assistant Examiner* — Marlon A Arce
(74) *Attorney, Agent, or Firm* — Knobbe, Martens, Olson & Bear, LLP

(57) ABSTRACT

Devices are for compensating for the roll of a fifth-wheel coupling, such as on a prime mover towing a semi-trailer. An automated compensation system for a fifth-wheel coupling mounted on a towing vehicle unit includes a first pivoting support to support one lateral side of the fifth-wheel coupling; a second pivoting support to support an opposite lateral side of the fifth-wheel coupling; an actuator configured to cause movement of the first and second pivoting supports; a sensor to sense a parameter relevant to determining whether roll compensation is required for the vehicle; a controller configured to receive a sensor output of the sensor and to determine whether roll compensation is required based on the sensor output, the controller being further configured to issue a control signal to cause the actuator to move the first and second pivoting supports when the controller determines that roll compensation is required.

20 Claims, 20 Drawing Sheets

(56) References Cited

U.S. PATENT DOCUMENTS

| | | | |
|---|---|---|---|
| 2,958,542 A | | 11/1960 | Janeway |
| 3,122,382 A | | 2/1964 | Carrier |
| 3,309,111 A | | 3/1967 | Vaugoyeau |
| 3,528,683 A | | 9/1970 | Janeway |
| 4,585,248 A | * | 4/1986 | Miller ................ B62D 53/0871 280/455.1 |
| 5,511,812 A | * | 4/1996 | Milner .................... G01L 5/136 280/433 |
| 6,641,161 B1 | | 11/2003 | McLelland |
| 7,380,810 B1 | | 6/2008 | Wilkens et al. |
| 8,505,949 B2 | * | 8/2013 | Temple ................... B60D 1/64 280/421 |
| 9,862,242 B2 | * | 1/2018 | Lurie ..................... B60D 1/015 |
| 2013/0062860 A1 | * | 3/2013 | Hao .................... B62D 15/021 280/492 |
| 2015/0353150 A1 | * | 12/2015 | Ursich ................... B62D 37/04 280/755 |
| 2018/0118199 A1 | * | 5/2018 | Chaney, Jr. ........... B60W 50/12 |
| 2019/0118876 A1 | * | 4/2019 | Schutt .................... B62D 53/10 |
| 2021/0179208 A1 | * | 6/2021 | Kim ........................ B60D 1/14 |

FOREIGN PATENT DOCUMENTS

| | | |
|---|---|---|
| EP | 0030607 A2 | 6/1981 |
| FR | 2357416 A1 | 2/1978 |
| GB | 825821 A | 12/1959 |
| GB | 830303 A | 3/1960 |
| WO | WO 1997/30866 A1 | 8/1997 |
| WO | WO 2008/134756 A2 | 11/2008 |
| WO | WO 2014/169347 A1 | 10/2014 |
| WO | WO 2016/163290 A1 | 10/2016 |
| WO | WO 2019/231473 A1 | 12/2019 |
| WO | WO 2020/064391 A1 | 4/2020 |

OTHER PUBLICATIONS

Extended European Search Report issued in EP Application No. 21756176.0, dated Feb. 21, 2024.

International Search Report and Written Opinion issued in International Application No. PCT/AU2021/050145, mailed on Mar. 26, 2021.

* cited by examiner

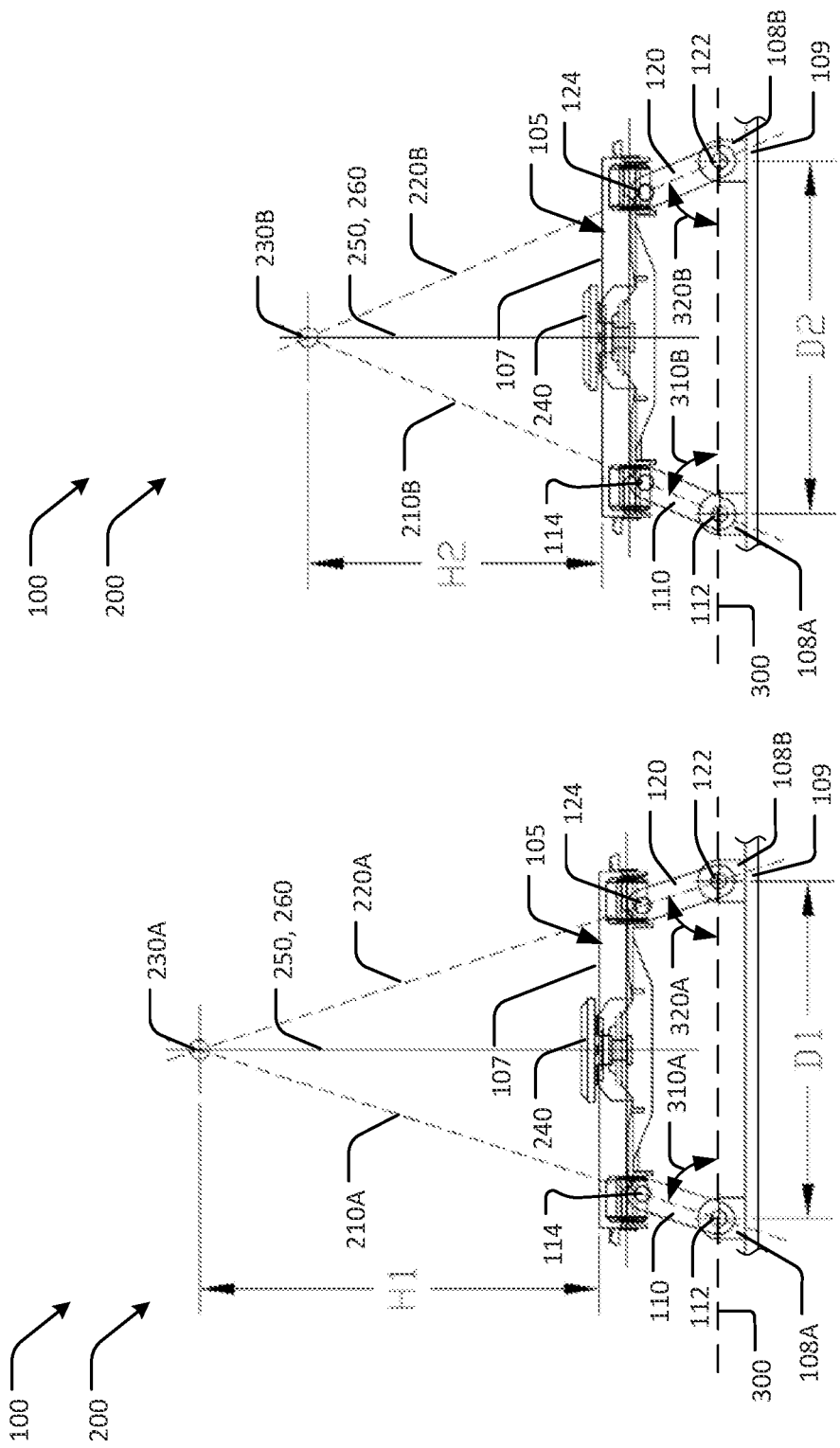

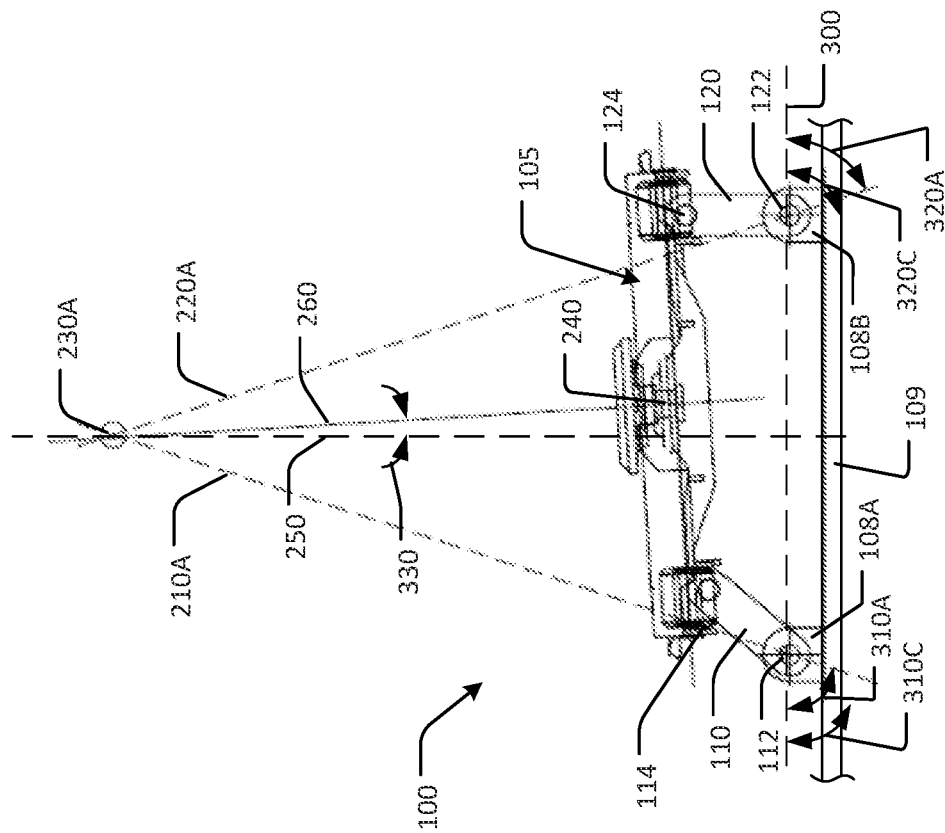
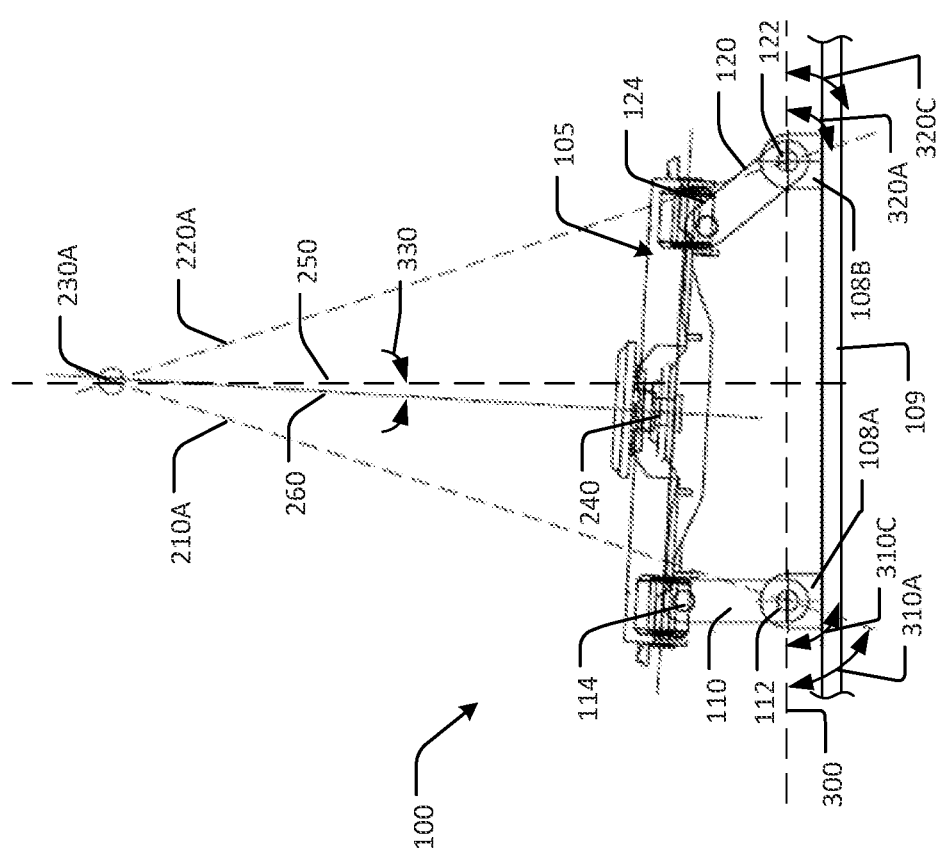

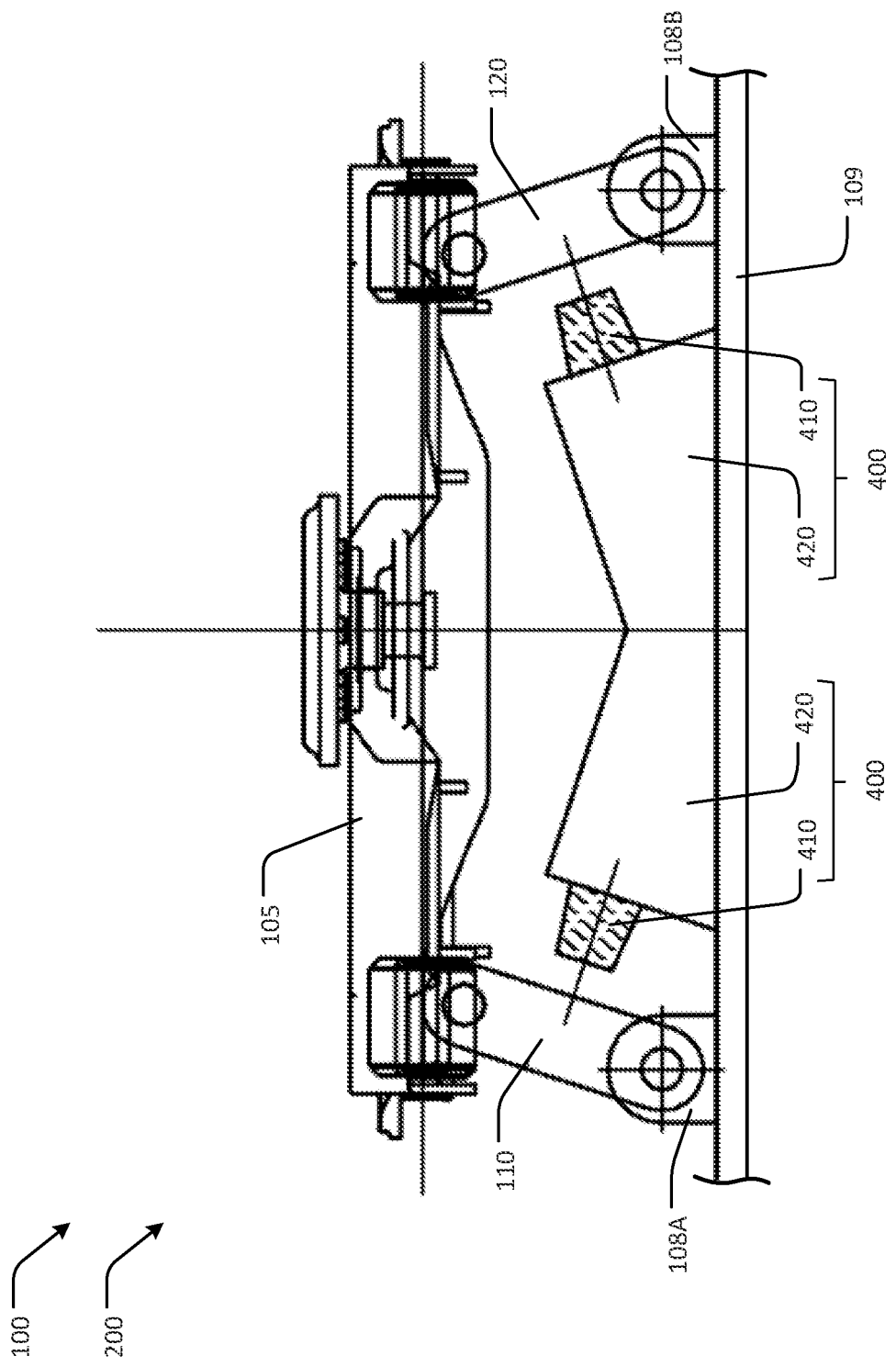

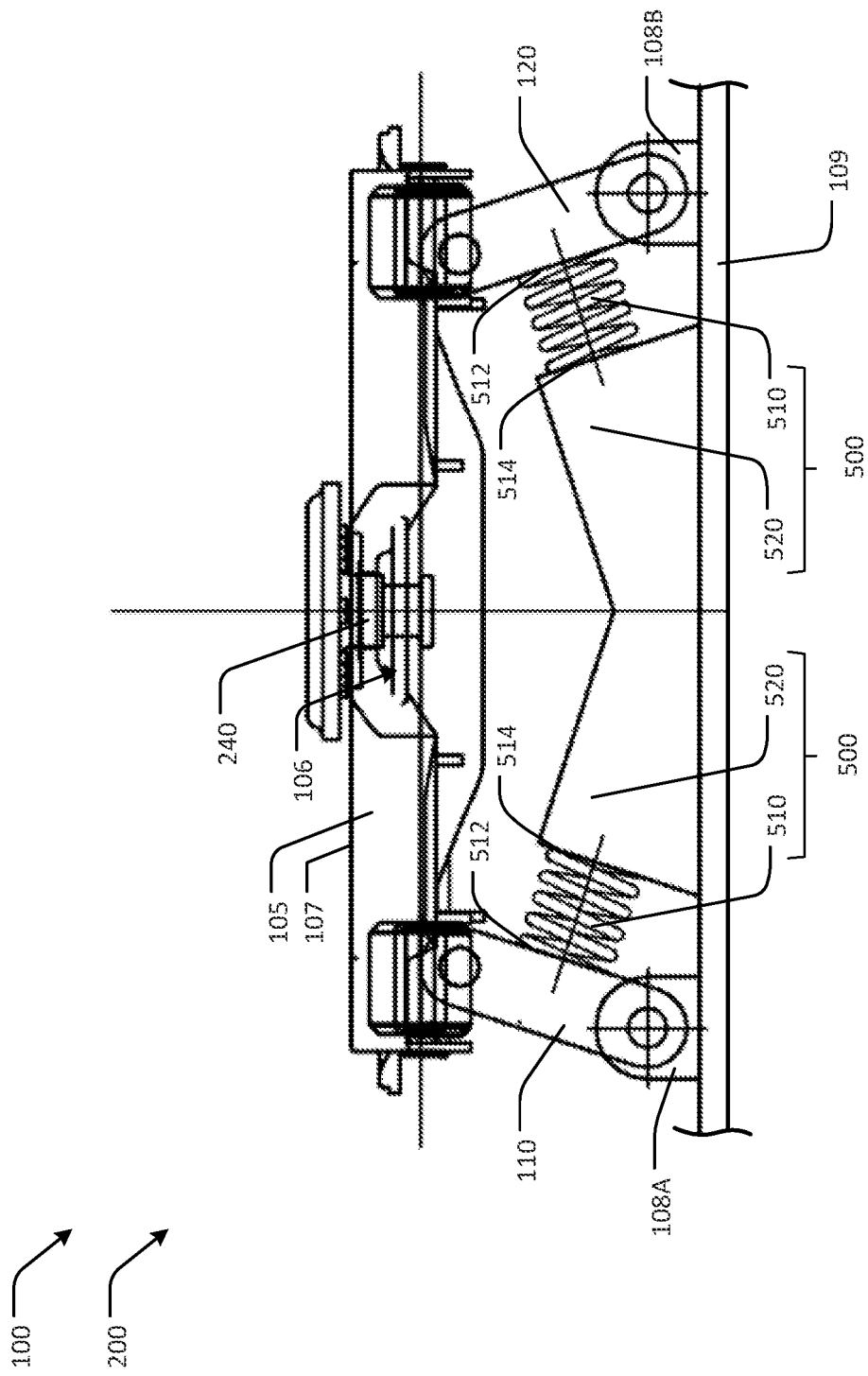

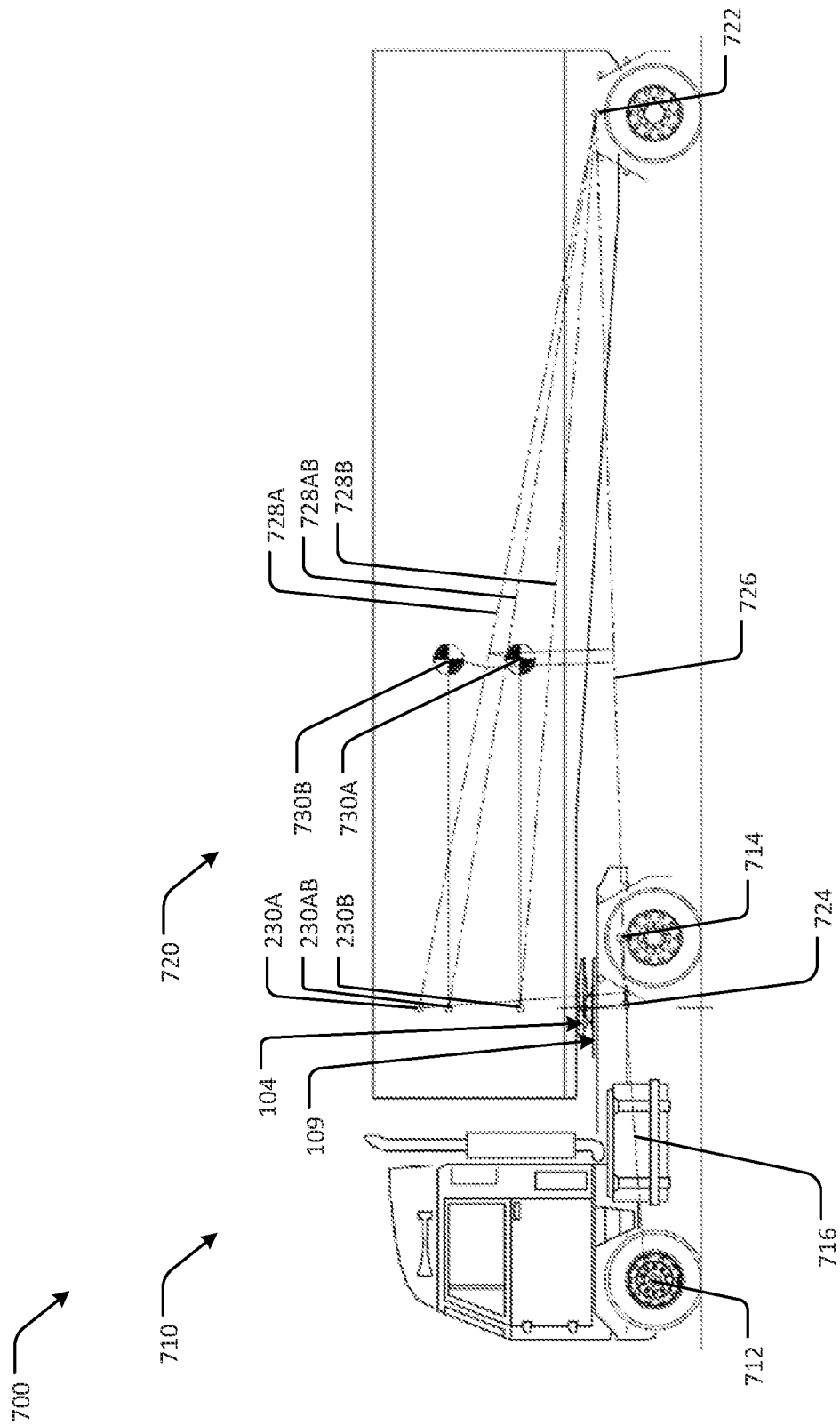

AUTOMATED COMPENSATOR FOR FIFTH-WHEEL COUPLINGS

CROSS REFERENCE TO RELATED APPLICATION

This application is a national phase entry of International Patent Application No. PCT/AU2021/050146, filed Feb. 19, 2021, which is directed to a development of the invention disclosed in the International Patent Application PCT/AU2021/050145, filed Feb. 19, 2021. The International Patent Application PCT/AU2021/050145 contains all of the description and drawings of the International Patent Application No. PCT/AU2021/050146.

TECHNICAL FIELD

The present disclosure relates generally to compensation mechanisms for a fifth-wheel coupling (alternately referred to as a turntable) for connecting one vehicle unit to another vehicle unit in goods-carrying freight or road vehicles having a rigid truck or a prime mover towing a trailer or a set of trailers.

BACKGROUND

Fifth-wheel couplings are used to connect a towed vehicle unit to a towing vehicle unit, such as a semi-trailer to a prime mover, a semi-trailer to another semi-trailer, or a semi-trailer to a converter dolly, for example in a freight or combination vehicle such as a B-double, B-triple or A-double. The fifth-wheel coupling has a connecting or coupling part which comprises a typically semi-circular table plate, also referred to as a top plate or coupler plate, wherein the coupler plate defines a central hole and a vee section cut-out which in use is oriented towards the towed vehicle unit. A pair of coupling jaws is attached to the underside of the coupler plate and the jaws are configured to engage and retain a middle section of a kingpin, wherein the middle section is narrower than a lower section of the kingpin. The kingpin is usually mounted on the front underside of a towed vehicle unit, such as a semi-trailer, on a skidplate. To connect the towed vehicle unit to the towing vehicle unit, the kingpin is guided through the vee section into the central hole, which causes the narrow middle section of the kingpin to engage the coupling jaws and retain the kingpin. The towed vehicle unit is then lowered so that the skidplate rests on and is supported by the top surface of the coupler plate.

When executing a turn on a road or highway, or when traversing uneven roadways or terrain, a freight vehicle as a whole may undergo a roll rotation. Roll rotation is largely in the vertical-transverse plane about a longitudinal axis nominally aligned with the direction of travel. During turns the fifth-wheel coupling connects adjacent vehicle units and effectively prevents the two connected vehicle units from rolling relative to each other. As the vehicle travels over uneven ground or goes around a corner executing a turn, in some designs these loads and the resulting stresses can lead to increased and excessive wear, and to failures in some cases, in couplings and in immediately adjacent areas, particularly in freight vehicles that feature semi-trailers with load carrying structures that are very stiff in torsion about the roll axis. Freight vehicles that fall into this class include road tankers designed to carry liquids, powders and other materials in bulk.

Allowing a limited amount of roll to be transferred between towing and towed vehicle units spreads the overturning rolling moment along the vehicle to the suspensions and may improve the vehicle's stability. Some fifth-wheel couplings are designed to accommodate a limited amount of roll by having some clearance in the connection between the kingpin and the coupler plate and the jaws that retain the kingpin in place. The clearance in the connection between the kingpin, coupler plate and its jaws allows limited upward vertical movement of the kingpin relative to the coupler plate before the lower section of the kingpin engages with the jaws; this movement is referred to as lash. The lash in fifth-wheel couplings may allow a maximum relative roll angle between connected towed and towing vehicle units, for example, in the range of about 1.5 to 3 degrees. The lash may generally increase with wear of mating parts. In this arrangement, when the lash is fully taken up, the resulting forces from the overturning rolling movement may significantly stress the fifth-wheel coupling together with its supports and the adjoining structures. More importantly, the presence of lash in fifth wheel couplings is known to be the cause of significant reduction in vehicle rollover stability as reflected in the vehicle's static rollover threshold, which is the level of lateral acceleration that a vehicle can sustain without rolling over during a turn.

It is desired to address or ameliorate one or more shortcomings or disadvantages associated with prior fifth-wheel couplings and compensators, or to at least provide a useful alternative thereto.

SUMMARY

Some embodiments relate to an automated compensation system for a fifth-wheel coupling mounted on a towing vehicle unit, the system comprising:
  a first pivoting support to support one lateral side of the fifth-wheel coupling;
  a second pivoting support to support an opposite lateral side of the fifth-wheel coupling;
  an actuator configured to cause movement of the first and second pivoting supports;
  a sensor to sense a parameter relevant to determining whether roll compensation is required for the vehicle;
  a controller configured to receive a sensor output of the sensor and to determine whether roll compensation is required based on the sensor output, the controller being further configured to issue a control signal to cause the actuator to move the first and second pivoting supports when the controller determines that roll compensation is required.

The actuator may be coupled to only the first pivoting support. The first pivoting support may include a support portion to provide support to the one lateral side of the fifth-wheel coupling; and may include a connector having a coupling portion that is coupled to the actuator. The connector may extend in a different direction from the support portion. The coupling portion may be spaced from the support portion.

The actuator may include or comprise a linear or rotary actuator. In some embodiments, the actuator is a linear actuator comprising a rod within an actuator body, such that the actuation of the actuator is a linear extension or retraction of the rod relative to the actuator body. The rod may be a tube or shaft. In some embodiments, the actuator is a rotary actuator comprising a rod, tube or shaft within an actuator body, such that actuation of the actuator is a clockwise or anti-clockwise rotation of the rod, tube or shaft relative to the actuator body, or a rotation of the rod (tube or shaft) about its axis.

The actuator may be configured to cause movement of the first and second pivoting supports by generating a moment about a pivot on or adjacent a mounting platform of the vehicle. The actuator may be mounted at least partially below the mounting platform. The actuator may be configured to cause lateral tilt of the fifth-wheel coupling of up to about 10°.

The first pivoting support may comprise an arm, the arm configured to extend from the first pivoting support to connect to the actuator. The arm may comprise a proximal end connected to the first pivoting support, and a distal end disposed opposite the proximal end and pivotally connected to the actuator, so that the arm provides leverage between the actuator and the first pivoting support.

The actuator may be disposed between the first and second pivoting supports, and the actuation of the rod may be in a direction that is substantially parallel to: (i) a global yaw axis about which yaw movement between the towing vehicle unit and a towed vehicle unit connected to the fifth-wheel coupling can occur; or (ii) a roll axis of the towing vehicle unit.

Movement of the fifth-wheel coupling relative to the mounting platform may be controlled by the actuation of the actuator. The actuation of the actuator may occur in response to a signal received from the controller based on output from the sensor, the sensor configured to provide vehicle information associated with the towing vehicle unit and a towed vehicle unit connected to the fifth-wheel coupling.

The sensor may be one of a plurality of sensors each sensing a parameter relevant to determining whether roll compensation is required for the vehicle. The plurality of sensors may each sense a parameter on any vehicle unit of the vehicle, such as the towing unit (rigid truck or prime mover) or the towed unit (a semi-trailer or converter dolly). The plurality of sensors may include at least one accelerometer. The plurality of sensors may include at least one load sensor configured to measure a fifth-wheel coupling load. The plurality of sensors may include at least one load sensor configured to measure a vehicle suspension load and/or deflection.

The automated compensation system as described above may further comprise a position sensor to provide a signal to the controller indicative of a position of the actuator. The system may further comprise a position sensor to provide a signal to the controller indicative of a position of the fifth-wheel coupling.

The automated compensation system as described above may further comprise a first trunnion, wherein the first pivoting support is pivotally connected to the first trunnion to define a first roll pivot; and a second trunnion, wherein the second pivoting support is pivotally connected to the second trunnion to define a second roll pivot; wherein the first and second trunnions are pivotally connected to the fifth-wheel coupling at respective first and second pitch pivots; wherein the first and second pitch pivots are coaxial, and perpendicular to the first and second roll pivots; and wherein the actuator indirectly exerts a force or moment to the first and second supports, through the first and second trunnions respectively, to cause movement of the supports.

The first and second trunnions may comprise respective first and second connectors disposed adjacent to the respective first and second roll pivots. The first and second connectors may each comprise a connector body defining at least one connector aperture, the connector aperture configured to receive a pin or bolt for connecting the connector aperture to a rod end bearing of the actuator.

The actuator may be or include an electric actuator comprising a motor, wherein the motor is configured to extend or retract the rod relative to the actuator body. The actuator may comprise a first end portion disposed at a first end of the actuator, wherein the first end portion pivotally connects the actuator to a base mount connected to the mounting platform. The actuator may further comprise a second end portion disposed at an opposite second end of the actuator, wherein the second end portion pivotally connects the actuator to at least one of the roll pivots via the trunnion.

The automated compensation system as described above may further comprise a limit assembly configured to exert a force or moment on at least one of the first and second pivoting supports to restrict movement of the supports. The limit assembly may comprise a first elastically deformable limit member, and wherein an applied force causing movement of each of the supports moves the supports so that at least one of the supports engages with the first elastically deformable limit member to direct at least part of the applied force through the first elastically deformable limit member. The limit assembly may comprise a second elastically deformable limit member, the second elastically deformable limit member connected to the first elastically deformable limit member so that at least part of the applied force transmitted through the first elastically deformable limit member is transmitted through the second elastically deformable limit member.

The first and second elastically deformable limit members may be connected in series, and the second elastically deformable limit member may be connected to the towing vehicle unit. The first elastically deformable limit member may be a spring, and the second elastically deformable limit member may be a bushing, the elastically deformable limit members being configured to dampen the applied force transmitted through to the first body.

Some embodiments relate to a towing vehicle unit having a fifth wheel coupling, the fifth wheel coupling being carried on the first and second pivoting supports of the automated compensation system as described above, the first and second pivoting supports being mounted on a mounting platform of the towing vehicle unit. The towing vehicle unit may be a prime mover or a trailer. The towing vehicle unit may be a rigid truck or a converter dolly. The fifth-wheel coupling may be mounted at a rear of the towing vehicle unit.

Some embodiments relate to an articulated vehicle comprising a towing vehicle unit and a towed vehicle unit, the articulated vehicle comprising a fifth-wheel coupling and the automated compensation system as described above, wherein the roll centre of the fifth-wheel coupling and a suspension roll centre of the towed vehicle unit define a towed vehicle unit roll axis adjacent to or above a centre of gravity of the towed vehicle unit.

Some embodiments relate to an articulated vehicle comprising a towing vehicle unit and a towed vehicle unit, the articulated vehicle comprising a fifth-wheel coupling and the automated compensation system as described above, wherein the roll centre of the fifth-wheel coupling and a suspension roll centre of the towed vehicle unit define a towed vehicle unit roll axis below a centre of gravity of the towed vehicle unit.

The towing vehicle unit may be a prime mover or a semi-trailer, and the fifth-wheel coupling may be connected to a rear portion of the prime mover or to a rear portion of the semi-trailer, respectively.

The first and second supports may have respective first and second longitudinal axes of the respective first and second pivoting supports, the longitudinal axes intersecting to at least in part define the location of the towed vehicle unit roll axis to be above the centre of gravity of the towed vehicle unit. The fifth-wheel coupling may be configured to engage a kingpin of the towed vehicle unit with a zero-clearance fit between the kingpin and the fifth-wheel coupling.

BRIEF DESCRIPTION OF DRAWINGS

Embodiments are described in further detail below, by way of example, with reference to the accompanying drawings, in which:

FIG. 3A is an end view corresponding to the compensated fifth-wheel coupling as shown in FIG. 2, showing the instant roll-centre at a first height, H1;

FIG. 3B is an end view showing the instant roll-centre at a second height, H2, the second height being lower than the first height shown in FIG. 3A;

FIG. 3C is an end view showing the compensated fifth-wheel coupling in a first tilted position;

FIG. 3D is an end view showing the compensated fifth-wheel coupling in a second tilted position, the second tilted position opposite to the first tilted position;

FIG. 4 is an end view showing the compensated fifth-wheel coupling according to some embodiments, including a limit assembly for restricting the lateral or roll/tilt movement of the compensated fifth-wheel coupling;

FIG. 5 is an end view showing the compensated fifth-wheel coupling according to some embodiments, including a further version of the limit assembly of FIG. 4;

FIG. 7 is a schematic illustration in elevation view showing the compensated fifth-wheel coupling in the context of connecting a prime mover and semi-trailer, wherein the compensated fifth-wheel coupling controls some of the roll overturning movement of the semi-trailer transferred to the prime mover;

DETAILED DESCRIPTION

Figure 1A:
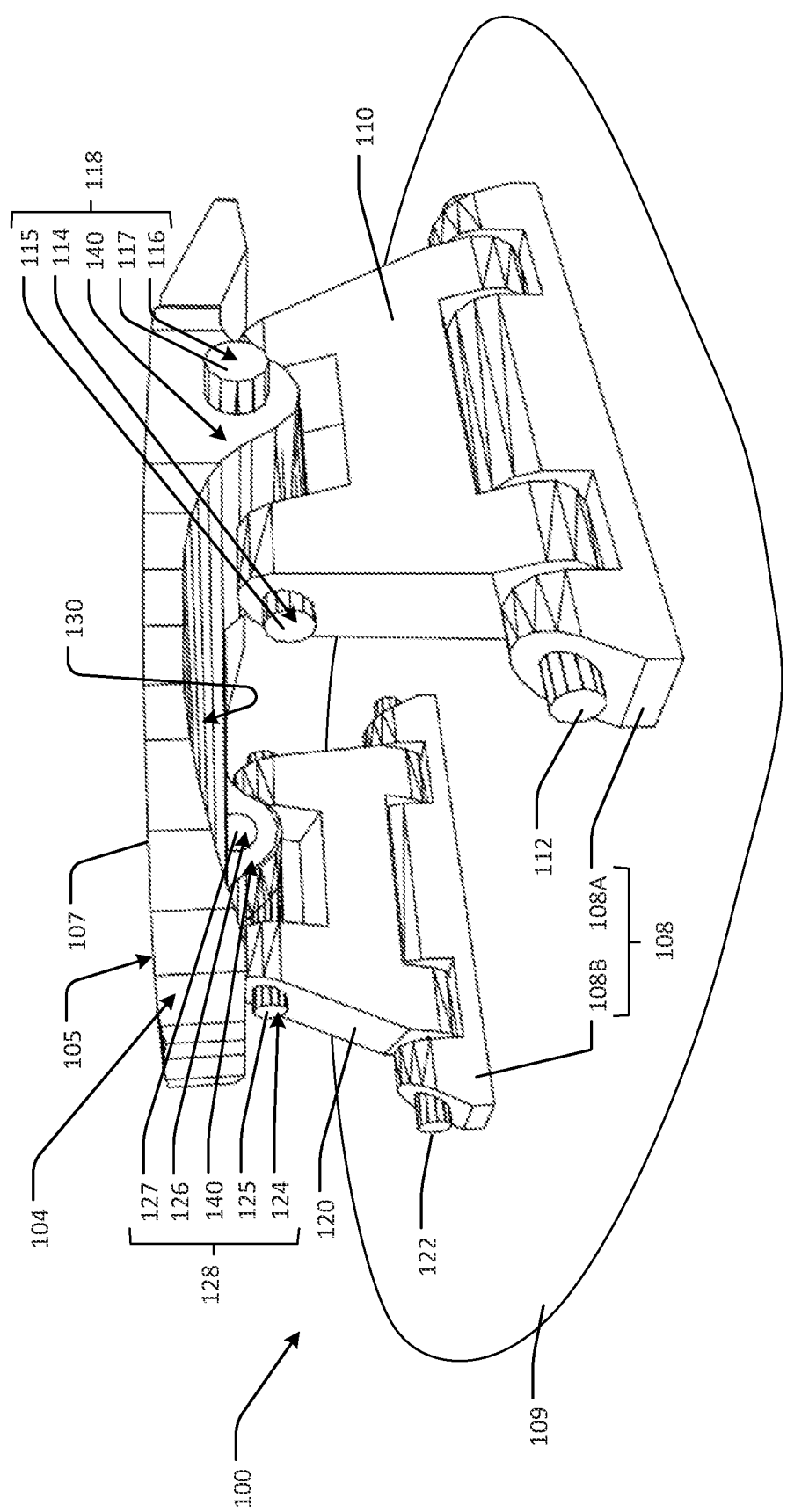
FIG. 1A is a perspective view of a compensated fifth-wheel coupling, comprising a fifth-wheel coupling attached to a compensator for controlling roll movements.

Vehicles commonly feature a body/chassis (sprung mass) connected to and suspended above a set of axles or axle groups by a suspension system. The geometry of the vehicle's suspension sets a roll centre for each axle or axle group of the vehicle. The roll axis is a line or an axis extending through the roll centres of adjacent axles or axle groups. Roll refers to rotation about an axis, largely horizontal, and largely pointing in the direction of travel. The sprung mass of the vehicle has a centre-of-gravity which is typically vertically offset from the roll axis. For a heavy goods vehicle comprising multiple vehicle units, each vehicle unit comprises one or more axles and associated suspensions, and each vehicle unit features a sprung mass. Vehicle units can include a rigid truck, prime mover, semi-trailer and converter dolly, and a combination vehicle can be made up of two or more of these vehicle units connected in series in some way leading with a rigid truck or a prime mover.

The roll axis is the axis about which the sprung mass of the vehicle unit will tend to roll (rotate) when its centre of gravity moves laterally from its central position, for example as the vehicle travels over uneven ground or goes around a corner. Directional changes or travel over uneven terrain also causes each suspension to deflect in response to the changing under wheel conditions and changing loads, which may cause the location of the roll centres (and therefore the roll axis) to move very slightly.

The distance between the centre of gravity and the roll axis affects the amount of roll, the roll stiffness of each suspension affects the distribution of the roll or overturning movement along the vehicle, which affects the stability of the vehicle. Increasing the total suspension roll stiffness increases the resistance to roll movement, and individual suspensions with the greatest roll stiffness will generally provide the greatest resistance to roll movement. Where there is a set of axles (two or more) forming an axle group, then the characteristics of each axle group will affect the stability of the vehicle. Roll and vertical movement of the sprung mass is generally undesirable and suspension systems are designed to absorb road surface unevenness as well as bumps and undulations when traversing uneven terrain.

Disturbances that cause the sprung mass to roll will result in lateral movement of the sprung mass and a resultant further destabilising overturning moment. Accordingly, minimising the distance between the roll axis and the sprung mass centre of gravity has benefits for vehicle stability.

The majority of articulated heavy goods freight vehicles operating on roads comprise a single semi-trailer connected to a prime mover by a fifth-wheel coupling. A road train is formed when further trailers are connected, through additional fifth-wheel couplings or a series of pin-type connections and fifth-wheel couplings to form a multi-trailer combination. Examples include B-doubles, comprising a prime mover towing two semi-trailers each connected to the other through a fifth-wheel coupling, a B-triple or B-quad, where one and two additional semi-trailers, respectively, are connected through fifth-wheel couplings to the lead B-double semi-trailer set. The fifth-wheel coupling, referred to in industry as a B-type connection (hence the "B" in B-double), is designed to allow the connected vehicles to pitch and yaw but constrains the roll rotation between vehicle units. Vehicle units are said to be roll-coupled when a fifth-wheel coupling is used to connect adjacent vehicle units.

Roll-coupling through a fifth-wheel coupling connection transfers rolling movements and overturning loads between adjacent vehicle units. These loads are transmitted through fifth-wheel couplings and taken up in adjoining structural members, such as the chassis of the semi-trailer, and payload carrying structures such as decks and tanks. Accordingly, if the towed vehicle unit experiences a sufficiently large sideways force resulting in a large overturning moment leading to a rollover situation, the moment loading in roll through the fifth-wheel coupling connection will force the towing vehicle unit to follow the roll rotation of the towed vehicle unit, and vice-versa. This means that in a rollover situation, both the towed and towing vehicle units will rollover together.

The connection between the kingpin and coupling jaws permits relative swivelling between the kingpin and the coupler plate and its jaws, thus allowing yaw movement between the connected towing and towed vehicle units when the freight vehicle executes a turn. For a stationary vehicle on a flat level surface, yaw is rotation largely about a vertical axis in the horizontal plane. When the vehicle executes a tight turn, articulation in yaw can be up to (and in some situations exceed) 90 degrees.

Each side of the coupler plate is pivotally connected to the top of a support, allowing some pitching movement of the towed vehicle unit (usually a semi-trailer). Pitch rotation is largely in the vertical-longitudinal plane about a transverse horizontal axis. The support is attached to a base plate affixed to the rear of the towing vehicle unit. The support may be directly connected to the rear of the towing vehicle unit. In some configurations, the support may be directly connected to the rear of the towing vehicle through a ball bearing (ballrace) turntable. The fifth-wheel coupling is therefore pivotally connected to the rear of the towing vehicle unit (which may be another trailer, semi-trailer, converter dolly or the prime mover), allowing relative rotation in yaw and some rotation in pitch. When the support is directly connected to the rear of the towing vehicle through a ballrace turntable, swivelling between the kingpin/skidplate and the coupler plate is no longer required and is prevented from occurring by a skidplate locking key, which is a wedge shaped piece of steel bolted to the skidplate. The skidplate locking key fits snugly in the vee section opening in the rear of the coupler plate thus preventing any swivelling between the coupler plate and skidplate when engaged, so that articulation in yaw is through the ballrace turntable.

By way of background, a pin-type connection, commonly referred to by industry as a Ringfeder or drawbar coupling, is designed to allow the connected vehicle units to pitch, yaw and roll relative to each other. Where a pin-type (Ringfeder) connection is used between adjacent vehicle units, complete and largely unconstrained rotation in roll can occur between adjacent vehicle units. A pin-type connection is referred to as an A-type connection and there is no roll-coupling between vehicle units when this type of connection is used. An example is an A-double combination, comprising a semi-trailer connected through a fifth-wheel coupling to a prime mover, which in turn is towing a trailer comprising a semi-trailer connected to a converter dolly through a fifth-wheel coupling. The trailer is connected to the rear of the lead semi-trailer through a drawbar which has at its towing point a pin-type connection. In a rollover situation the rear trailer of an A-double can rollover completely, rotating about the drawbar coupling, while the prime mover and lead semi-trailer remain upright. In a rollover scenario involving a B-double, B-triple or B-quad, the entire vehicle will rollover because all units in the vehicle are roll-coupled—if one semi-trailer tries to rollover, because all units are roll-coupled, all semi-trailers and the prime mover must rollover together for vehicle rollover to occur.

Some fifth-wheel couplings incorporate a "compensator" mechanism allowing the coupler plate to roll relative to the fixed main support (base plate), such as by rocking side-to-side. These "compensated" fifth-wheel couplings typically allow a maximum roll angle, for example, up to 5 degrees, which is greater than uncompensated fifth-wheel couplings that rely on lash clearance. Typical compensator mechanisms may comprise an arrangement of springs, bushes, or stops, acting to control and limit the amount of rolling or rocking movement. These arrangements may reduce the forces being directed into the fifth-wheel coupling and fixed main supports. The moving parts in these arrangements typically comprise large, circular, sliding, load bearing surfaces requiring careful manufacture, frequent lubrication and maintenance to ensure smooth action and adequate operating life. Furthermore, these fifth-wheel couplings typically roll about a roll centre located at a single fixed height above the fifth-wheel coupling, and the roll axis is not considered. It is not possible to change the roll centre height in these conventional compensator designs without a costly major redesign.

The present disclosure relates to a compensated fifth-wheel coupling comprising a mechanism that is interposed between the fifth wheel coupler plate and the base plate that is attached to a mounting area of the towing vehicle unit. This allows for limited and controlled lateral movement and tilting of the coupler plate in response to the relative rolling action between adjacent vehicle units when the vehicle is traversing uneven terrain, when negotiating a turn or when changing direction. Compensating for this rolling may lead to improvements in vehicle rollover stability. Compensating for this rolling may substantially reduce loads and stresses in combinations that feature stiff chassis and body structures, such as road tankers. Some embodiments relate to a system to automatically adjust a position of the fifth-wheel coupling. In some embodiments, the system actively controls and automatically adjusts the position of the fifth-wheel coupling. Active control of fifth-wheel coupling tilt provides the capacity to substantially further improve vehicle dynamics and stability. Such embodiments are described in further detail below with respect to FIGS. 8A to 11.

Figure 1B:
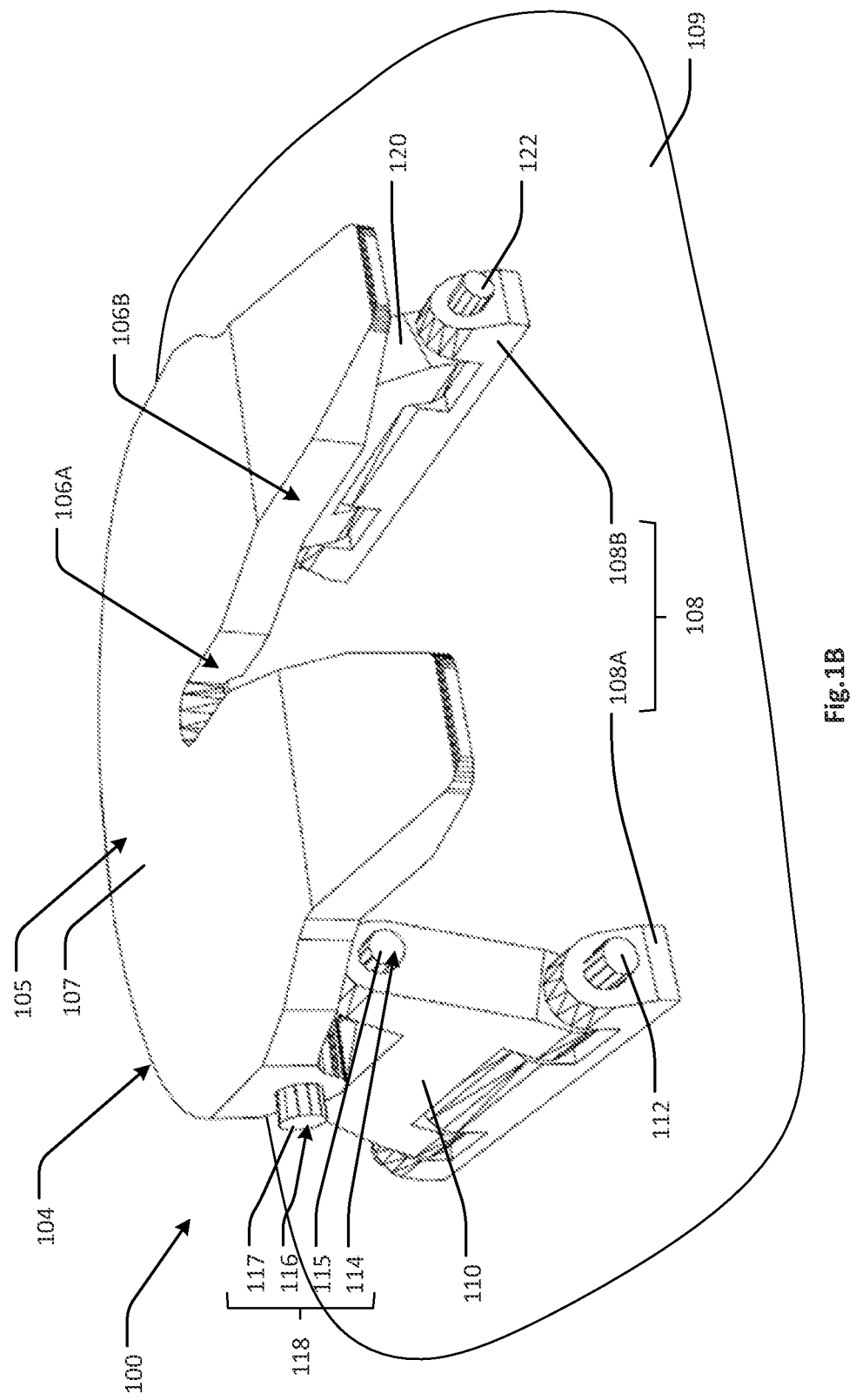
FIG. 1B is a perspective view of the reverse side of the compensated fifth-wheel coupling of FIG. 1A, showing the coupler plate, vee opening and central hole for receiving a kingpin within the coupling jaws (not shown)
Figure 2:
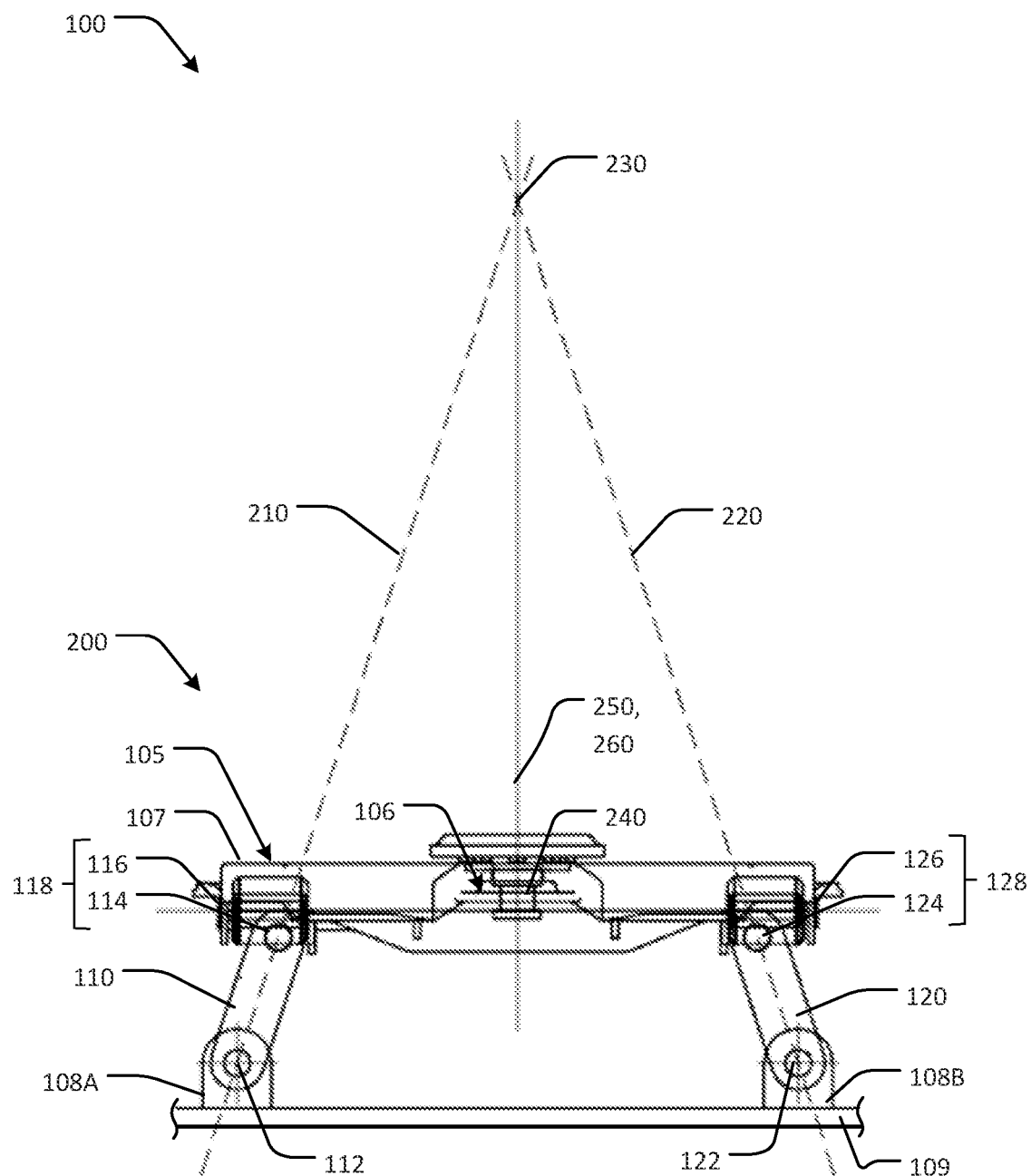
FIG. 2 is an end view of the compensated fifth-wheel coupling of FIGS. 1A and 1B.

FIGS. 1A, 1B, and 2 show an embodiment of a fifth wheel coupling compensator 100 for compensating roll movement of the fifth-wheel coupling 104. The fifth wheel coupling 104 comprises a coupler plate 105 having a body defining a central hole 106A with jaws (not shown) for accommodating and retaining a kingpin 240 (FIG. 2) of a towed vehicle unit to be connected to coupler plate 105. The body of the coupler plate 105 further defines a vee-shaped cut-out or opening 106B which is arranged to guide the kingpin 240 towards the central hole 106A. The coupler plate 105 comprises a top surface 107 which in some embodiments is a substantially flat surface configured to align with another substantially flat surface (a skidplate) to which the kingpin is attached. The coupler plate 105 further comprises an underside portion 130 which is disposed opposite the top surface 107. The compensator 100 may comprise a mounting structure 108 for connecting the compensator 100 to a first body, such as a mounting platform 109 of a towing vehicle unit. The mounting structure 108 may comprise a foot mount load supporting arrangement, such as brackets 108A, 108B, which is attached to the mounting platform 109 and allows roll movement of the fifth-wheel coupling 104 relative to the mounting platform 109. The mounting platform 109 is a rigid assembly connected to a towing vehicle unit, for example a steel plate coupled to a rear portion of a prime mover or semi-trailer, or the main load supporting area of a converter dolly. The mounting platform can also be existing chassis rails or any suitable supporting structure. For example, the Australian/New Zealand Standard 4968.2:2003 demonstrates various configurations of the mounting platform, such as a fixed base assembly configuration comprising a base plate coupled to angle sections (FIG. 3.3 of the Standard), a sliding base assembly configuration comprising a slider that is slidably connected to rails (FIG. 3.4 of the Standard), or a turntable base assembly configuration comprising a ball bearing turntable or slewing ring mounted to a base plate (FIG. 6.1 of the Standard) and including load distributor feet plates for the fifth-wheel coupling to be mounted to the ball bearing turntable and a skidplate locking key as described earlier. The loads associated with the roll rotation of coupler plate 105 can be reduced between the towed and towing vehicle units by the compensator 100.

Herein, unless noted otherwise, reference to a towing vehicle unit refers to an articulated vehicle arrangement where the towing vehicle unit is connected to a towed vehicle unit via a fifth-wheel coupling. The towing vehicle unit may be a prime mover, or a semi-trailer to which another semi-trailer is connected. The towed vehicle unit is typically a semi-trailer for the transportation of liquids or materials in bulk. References herein to "towing vehicle unit" and "towed vehicle unit" are relative, in that when the combined articulated vehicle is travelling in a forward direction, the towing vehicle unit is the unit in front of (and towing) the towed vehicle unit. Unless noted otherwise, there is no requirement for the "towing vehicle unit" as described herein to be a source of drive power, such as a prime mover. Accordingly, a (unpowered) converter dolly may be a towing vehicle unit.

The compensator 100 may further comprise a first support 110 comprising a first mounting pivot 112 and a first coupling pivot 114, and a second support 120 comprising a second mounting pivot 122 and a second coupling pivot 124, wherein the first and second supports 110, 120 are each pivotally connected to the mounting structure 108 at their respective mounting pivots 112, 122. The pivots 112, 114, 122, 124 are roll pivots, as they permit roll of the fifth-wheel coupling 104 relative to the mounting plate 109. The first coupling pivot 114 is rigidly connected to a first transverse coupling pivot 116, and the second coupling pivot 124 is rigidly connected and locked at right angles (when viewed from above) to a second transverse coupling pivot 126. The coupling pivots 116, 126 are pitch pivots, as they permit pitch of the fifth-wheel coupling 104 relative to the mounting plate 109. The coupling pivots 114, 116 together form a first roll-pitch spider 118. Similarly, the coupling pivots 124, 126 together form a second roll-pitch spider 128. As shown in FIG. 1A, the spiders 118, 128 each comprise a trunnion 140 which projects from the underside of the coupler plate 105. The trunnion 140 may be disposed at opposite lateral sides of the coupler plate 105. The trunnion 140 may be integrally formed with the coupler plate 105, or may be a separate component (such as shown in FIG. 12B). The trunnion 140 defines apertures for receiving axles or pins 115, 125 to enable the coupler plate 105 to roll about the coupling pivots 114, 124. For the coupler plate 105 to roll as described the apertures align the axles or pins 115, 125 so that their longitudinal axes are parallel with each other. The trunnion 140 further defines apertures for receiving axles or pins 117, 127 to enable the coupler plate 105 to pitch about the coupling pivots 116, 126. For the coupler plate 105 to pitch as described, these apertures are coaxial. The coupling pivots 116, 126 are each configured to be pivotally connected to the coupler plate 105. The coupling pivots 116, 126 give the coupler plate 105 freedom to rotate in pitch relative to roll coupling pivots 114, 124. The pitch rotation freedom of the coupler plate 105 through the coupling pivots 116, 126 described above is consistent with the operation of a conventional fifth-wheel coupling mounted on pedestal or foot mount supports.

In some embodiments, the mounting structure 108 may comprise a single structure to which the first and second supports 110, 120 are connected, coupled, or linked. In some embodiments, such as shown in FIG. 1A and FIG. 1B, the mounting structure 108 may comprise separate bases, mounting structures, a ballrace (bearing) turntable, or the brackets 108A, 108B to which the first and second supports 110, 120 are respectively linked.

In some embodiments, the compensator 100 as described herein is compatible with configurations of the articulated vehicle comprising the towed and towing vehicle units connected via a non-separable turntable. A non-separable turntable (or non-separable fifth-wheel coupling) lacks the quick-release kingpin-and-jaw mechanism of conventional fifth-wheel couplings. In a non-separable turntable, the pitch pivots (116, 126) are integrally-mounted to the underside of the front end of the towed vehicle unit (usually a rear tipping semi-trailer). This may be achieved by fixedly connecting the coupler plate 105 to the underside of the towed vehicle unit, or by removing the coupler plate 105. Accordingly, in a non-separable fifth-wheel coupling, pitch occurs about an axis that is always perpendicular to the roll axis of the towed vehicle unit. The towed and towing vehicle units are configured to yaw (swivel) relative to each other via a ballrace (bearing) turntable mounted on the rear portion of the towing vehicle unit (a prime mover or semi-trailer, or middle section of the load carrying area of a converter dolly). In these configurations, the compensator 100 is installed to connect the ballrace turntable with the pitch pivots 116, 126. The coupler plate 105, kingpin and towed vehicle unit skidplate are not present in non-separable turntable configurations.

FIG. 2 shows coupler plate 105 in a neutral position 200, wherein the towing vehicle unit (to which the fifth-wheel coupling compensator 100 is attached) and the towed vehicle unit are not rotated in roll relative to each other. This may be, for example, when the articulated vehicle is travelling in a straight line on a substantially flat and level road surface.

A first reference line or first axis 210 extends through the first mounting pivot 112 and the first coupling pivot 114, and a second reference line or second axis 220 extends through the second mounting pivot 122 and the second coupling pivot 124. In some embodiments, the first and second supports 110, 120 are elongate members, and the first and second axes 210, 220 coincide with respective longitudinal axes of the first and second supports 110, 120. In some embodiments, the first and second supports 110, 120 are rigid so that roll movement of coupler plate 105 first occurs about the mounting pivots 112, 122 and/or the coupling pivots 114, 124. The first and second supports 110, 120 may be made of any suitable material, such as a metal or a non-metal, such as a fibre-reinforced composite, or a combination thereof. A key consideration in the selection of materials is to reduce the weight of the compensator 100. Materials such as steel would be suitable, having mechanical properties similar to the properties currently found in coupler plates, pedestal and foot mounts, and pin-type couplings. Suitable steels would include Grade 350 mild steel having a minimum yield strength of 350 MPa, for example. In some embodiments, high-strength aluminium alloys with comparable minimum yield strength to Grade 350 mild steel may be used. The materials selected should also allow the compensator 100 to accommodate vertical and lateral loads, and longitudinal fore-aft loading consistent with normal and also extreme multiple event acceleration and braking over a prolonged period, to reduce the likelihood of fatigue failure, serious maintenance or replacement of the compensator 100. The weight of the compensator 100 may also be kept low by choosing manufacturing techniques which have a high strength-to-weight ratio, such as forging. A forged steel part typically has a higher strength and lower weight compared to an equivalent part machined from a block of steel. However, in some embodiments of the compensator 100, machined steel parts or steel castings may still be used.

Use of the compensator 100 for compensating roll movement of the coupler plate 105 comprises the mounting structure 108 connected to the towing vehicle unit, for example to the mounting platform 109. The first and second supports 110, 120 are pivotally connected at the respective first and second mounting pivots 112, 122 to the mounting structure 108. For example, the first support 110 is pivotally connected at the first mounting pivot 112 to the bracket 108A, and similarly the second support 120 is pivotally connected at the second mounting pivot 122 to the bracket 108B. The first and second supports 110, 120 are pivotally connected to the coupler plate 105 to support and allow movement of the coupler plate 105 relative to the mounting structure 108. The first and second supports 110, 120 are aligned with respect to each other such that the first and second axes 210, 220 intersect at a point distant to the coupler plate 105. This point or intersection defines an instant roll centre 230 about which the coupler plate 105 may subsequently move laterally (transverse to the forward direction of travel of the vehicle) and rotate, for example in response to a force applied to the coupler plate 105 when the kingpin 240 is received and locked in the central position 106. The first and second supports 110, 120 are aligned respective to each other such that the coupler plate 105 effectively rotates about the roll centre 230 over a small range of angles. The roll movement of the coupler plate 105 results in rotation of the first and second supports 110, 120 about their respective pivots 112, 122.

The net effect for a sprung mass centre of gravity below the roll axis is a favourable change in the distribution of the overturning moment between the participating axle group suspensions. Without the compensator, as described above, the mismatch in roll stiffness between the drive and semi-trailer group suspensions leads to earlier wheel-lift at the semi-trailer axle group and a lower static rollover threshold value for the combination.

Under normal vehicle operation, roll movement and loading in roll of the coupler plate 105 usually occurs through the skidplate mounted underneath the front of the semi-trailer. This occurs whenever there is a roll imbalance imposed on the vehicle due to travel over uneven roads or terrain, while executing a turn, or when performing transient manoeuvres, such as a lane change, or when changing direction. Under extreme conditions, typically when wheel lift has occurred on the semi-trailer axle group (which usually has greater roll stiffness than the prime mover axle group) and the vehicle is approaching rollover as the front of the semi-trailer continues to roll, the kingpin 240 may eventually be pulled upwards. The upward movement of the kingpin 240 transfers a vertical load to the centre of the coupler plate 105 where the kingpin 240 is connected to the coupling jaws, further increasing the overturning/rolling moment on the towing vehicle unit. The amount of rolling movement transferred from the kingpin 240 to the central hole 106A at the centre of the coupler plate 105 depends on the amount of vertical clearance between the kingpin 240 and the central hole 106A.

Conventionally, some fifth-wheel couplings have a clearance between the kingpin and the central hole which allows limited movement (lash) of the kingpin 240 within the central hole 106A before the kingpin 240 engages with and transfers load to the surrounding body of coupler plate 105 which defines the central hole 106A. For uncompensated fifth-wheel couplings, the clearance between the kingpin and the central hole in the coupler plate allows a small amount of vertical movement. While this allows a small amount of relative roll movement across the fifth-wheel coupling between the towing and towed vehicle units, thereby relieving some structural loads due to roll, it has an adverse effect on the stability of the vehicle by reducing its rollover stability threshold. For the compensated fifth-wheel coupling 100, as described herein, a zero-clearance fit between kingpin 240 and the central hole 106 in the coupler plate and skid-plate can be introduced thereby increasing vehicle rollover stability in prime-mover and semi-trailer road tanker combinations.

Movement of the kingpin 240 in the central hole 106A of the coupler plate 105 may include roll, pitch, and yaw movement. Yaw of the kingpin 240 and hence yaw of the towed vehicle unit may be measured relative to a global ground-fixed yaw axis 250. The global yaw axis 250 is a vertical axis that is perpendicular to the forward direction of travel. In some embodiments, the supports 110, 120 are positioned so that when the fifth-wheel coupling 104 is in the neutral position 200 as shown in FIG. 2, the roll centre 230 as defined by the intersection of the first and second axes 210, 220 intersects with the yaw axis 250.

Clearance (lash) or free-play between the kingpin 240 and the coupler plate 105 may allow a small angle to be formed between the global yaw axis 250 and an axis aligned with a kingpin axis 260 of the kingpin 240. The kingpin axis 260 is collinear with the axis of revolution of the kingpin 240. As shown in FIG. 2, the axis 260 generally defines the axis along which the kingpin 240 may move vertically (vertical lash) before the kingpin 240 engages the coupler plate 105 through central hole 106A. In some embodiments of the compensator 100, the supports 110, 120 may have a range of tilt movement which allows a zero-clearance fit between the kingpin 240 and the coupling jaws/coupler plate 105 through the central hole 106A. In some configurations, the zero-clearance fit may lead to practical difficulties for the prime mover to connect to the semi-trailer. If a zero-clearance fit is not practicable, a standard (snug) fit between the kingpin 240 and the coupling jaws/coupler plate 105 through the central hole 106A may be used, with a clamping arrangement put in place between the coupler plate 105 and kingpin 240 to effectively produce a zero-clearance fit when the prime move and trailer are connected. This clamping arrangement may be primarily mechanical, with other clamping mechanisms, such as pneumatic, hydraulic, electric, and/or electromagnetic mechanisms, being used to assist and/or actuate the clamping arrangement. The clamping arrangement may be automatically activated (e.g. by a control system carried by the vehicle 700) or manually activated. The zero-clearance fit, or at least a snug fit, between the kingpin 240 and the coupling jaws/coupler plate 105, substantially eliminates lash. Non-separable couplings, as described earlier, are inherently equivalent to zero-clearance fit, no-lash, fifth-wheel couplings.

In some embodiments, the supports 110, 120 are positioned so that when the coupler plate 105 is in the neutral position 200, kingpin axis 260 intersects with the roll centre 230 as defined by the intersection of the first and second axes 210, 220. Positioning kingpin axis 260 to be aligned or collinear with the roll centre 230 in the neutral position 200 may distribute the forces associated with the roll movement of the fifth-wheel coupling 104 more evenly between the supports 110, 120, compared to if the kingpin axis 260 was not aligned with the instant roll centre 230. That is, there is advantage to having kingpin axis 260 aligned or collinear with the global yaw axis 250, when the vehicle is on a flat level surface.

For the purposes of kinematic analysis, the compensator 100 (with the first and second supports 110, 120 connected to a towing vehicle unit) may be represented or modelled as a planar four-bar linkage, comprising four links and four revolute joints. The supports 110, 120 each embody a link (two links in total), wherein each support 110, 120 (or link) has a revolute joint at each end, namely, at the mounting pivots 112, 122 and at the coupling pivots 114, 124, respectively. The coupler plate 105, which connects to the towed vehicle unit through the kingpin 240 and the kingpin's skidplate, forms a third link sharing the coupling pivots 114, 124 with the supports 110, 120, respectively. The fourth link is the mounting plate 109 which has the mounting pivots (revolute joints) 112, 122. Expressed in this way, the planar four-bar linkage defines a plurality of instant centres, wherein each instant centre is a point about which that link effectively rotates over a range of angles consistent with the neutral central starting position.

In this kinematic analysis, modelling the mounting plate 109 as fixed in space and not moving relative to ground, then the first support 110 has its instant centre at the first mounting pivot 112 (when it tilts, its centre of rotation is the centre of the mounting pivot 112), and in the same way the second support 120 has its instant centre at the second mounting pivot 122. The coupler plate 105, which has at each end the coupling pivots 114, 124, has its instant centre at the roll centre 230 above the coupler plate 105 as shown in FIG. 2. That is, as the coupler plate 105 moves sideways (tilts) to the left or right, the motion of the coupler plate 105 is constrained to follow a circular arc prescribed by the rotation of the supports 110, 120 about each of their respective rotation centres (mounting pivots 112, 122). As such the instant centre of rotation of the coupler plate 105 is located at roll centre 230. For a range of roll/tilt angles the coupler plate 105 will rotate about a point very close to the original location of the roll centre 230. For this application the location of the coupler plate 105 instant centre 230 measured relative to mounting plate 109 can be considered fixed for sideways movement consistent with the coupler plate 105 roll/tilt angles between zero and at least seven degrees measured from the neutral or central position 200. For coupler plate 105 roll/tilt angles greater than seven degrees and up to about 10 degrees, the location of the instant centre 230 changes without fully changing or detracting from the performance benefits offered by the compensator 100.

Turning now to FIGS. 3A-3D, the location of the roll centre 230 may be expressed as a height H above the top surface 107 of the coupler plate 105. The height H may be between approximately 0.25 m and approximately 4 m. In some embodiments, the height H is between approximately 1 m and approximately 3 m. In some embodiments, the height H is between approximately 1 m and approximately 2 m. The spacing of or distance between the mounting pivots 112, 122 may be expressed as a distance D. The distance D may be between approximately 0.5 m, or less depending on the overall width (measured in the same direction as D) of the coupler plate 105, and approximately 2 m. In some embodiments, the distance D is between approximately 1 m and approximately 2 m. The distance D may be measured along a mounting axis 300, which connects the mounting pivots 112, 122. The mounting axis 300 defines a first support angle 310 with the first axis 210, and defines a second support angle 320 with the second axis 220. FIG. 3A shows the roll centre 230A (defined by the intersection of axes 210A, 220A) at a first height H1 above the top surface 107 of the coupler plate 105, which is in the central or neutral position 200. The height H1 may, for example, be approximately 1.5 m. FIG. 3A also shows the mounting pivots 112, 122 spaced apart at a distance D1. The distance D1 may, for example, be approximately 1 m. Similarly, FIG. 3B shows the roll centre 230B (defined by the intersection of axes 210B, 220B) at a second height H2 above the top surface 107 of the coupler plate 105 which is also in the central or neutral position 200. The height H2 may, for example, be approximately 1 m. FIG. 3B also shows the mounting pivots 112, 122 spaced apart at a distance D2. The distance D2 may, for example, be approximately 1.5 m. For a fixed distance between the coupling pivots 114, 124, the heights H1, H2 and distances D1, D2 are inversely proportional to each other; for example, reducing the height H requires an increase in the distance D. As shown, height H1 is larger than H2, distance D1 is smaller than D2, and in the neutral position 200, the angles 310A, 320A are larger than the angles 310B, 320B. For a set/fixed distance between the mounting pivots 112, 122, the height H of the roll centre 230 from the top surface 107 of the fifth-wheel coupling 104 may be adjusted by varying the spacing of or distance between the coupling pivots 114, 124.

In some embodiments, the mounting structure 108 may comprise an adjustment mechanism to allow variation of the distance D between the mounting pivots 112, 122. This allows the compensator 100 to adjust the height H of the roll centre 230 relative to the centre of gravity of the towed vehicle unit, thereby adjusting the amount of roll that the towed vehicle unit experiences when it changes direction or travels over an uneven surface. For example, if the towed vehicle unit is a load carrying semi-trailer, the centre of gravity of the semi-trailer may change position as goods are added, shift or move around, or removed. Furthermore, the height of the semi-trailer's load, its mass properties (centre of gravity height, mass distribution expressed as mass or polar moments of inertia) will depend on the semi-trailer's design and may differ across different makes and transportation of different freight commodities.

The adjustment mechanism for setting compensator 100's roll centre height may comprise a structure with a plurality of pre-set positions to which the mounting structure 108 may be moved and rigidly secured to set the desired distance D between the mounting pivots 112, 122, and accordingly, change the height H of the roll centre 230. The adjustment mechanism may comprise a rack and/or an actuator to allow adjustment of the distance D. In some embodiments, the adjustment mechanism comprises a ratchet and pawl system to allow gradual adjustment in one direction, and quick adjustment in the opposite direction when the pawl is released from engagement with the ratchet. In some embodiments, the adjustment mechanism comprises slots or slotted bolt holes, which allow spacing of the brackets 108A, 108B to be adjusted before the brackets 108A, 108B are secured to the mounting plate 109.

In some embodiments, the adjustment mechanism is configured to adjust a spacing of or distance between the coupling pivots 114, 124. The height H of the roll centre 230 may be adjusted by varying the spacing between the coupling pivots 114, 124 while the distance D between the mounting pivots 112, 122 is fixed. In some embodiments, the compensator 100 may comprise multiple adjustment mechanisms. Both the spacing between the coupling pivots 114, 124 and the distance D between the mounting pivots 112, 122 may be relatively adjusted by the adjustment mechanisms to achieve the desired height H of the roll centre 230.

In some embodiments, the desired height H of the roll centre 230 may be adjusted by adjusting the distance between the mounting and coupling pivots connected by the first and second supports 110, 120, while the distance D between the mounting pivots 112, 122 is fixed. Specifically, by adjusting the distance between the mounting and the coupling pivots 112, 114 on the first support 110, and by making the same adjustment to the distance between the pivots 122, 124 on the second support 120. Adjusting the distances between the between the pivots 112, 114 and the pivots 122, 124 would also change the height of coupler plate 105 above base plate 109.

FIGS. 3C and 3D show the coupler plate 105 in tilted positions, wherein the coupler plate 105 has tilted or rotated away from the neutral position 200 about the neutral position roll centre 230A, for example in response to relative roll movement between the towing and towed vehicle units. As described above, the tilt or inclination of the coupler plate 105 relative to the towing vehicle unit may be quantified in terms of a roll or tilt angle 330. The roll or tilt angle 330 is the angle measured between the top surface 107 and the mounting platform 109. When the fifth-wheel coupling 104 is in the neutral position 200, the roll or tilt angle 330 is zero. The roll or tilt angle 330 may be measured between the global yaw axis 250 and the kingpin axis 260, as shown in FIGS. 3C and 3D, if the towing vehicle unit is on a horizontal surface. Alternatively, if the top surface 107 and the mounting axis 300 are parallel in the neutral position 200, the roll or tilt angle 330 may be measured between the top surface 107 and the mounting axis 300. The roll or tilt angle 330 may be between zero and ten degrees.

When the coupler plate 105 is tilted towards the left, as shown in FIG. 3C, the first and second supports 110, 120 rotate in an anticlockwise direction. The anticlockwise rotation of the first and second supports 110, 120 increases the size of the first support angle 310C (measured between the first support 110 and the mounting axis 300) while decreasing the size of the second support angle 320C (measured between the second support 120 and the mounting axis 300). Meanwhile, the coupler plate 105 translates to the left, simultaneously rotating in a clockwise sense about instant roll centre 230A. Similarly, when the fifth-wheel coupling 104 is tilted towards the right, as shown in FIG. 3D, the first and second supports 110, 120 rotate in a clockwise direction. The clockwise rotation of the first and second supports 110, 120 decreases the size of the first support angle 310C while increasing the size of the second support angle 320C. When the coupler plate 105 is tilted towards the right, all of the movements and rotations shown in FIG. 3C are exactly mirrored in FIG. 3D. Accordingly, the coupler plate 105 translates to the right, simultaneously rotating in an anticlockwise sense about instant roll centre 230A.

Figure 6:
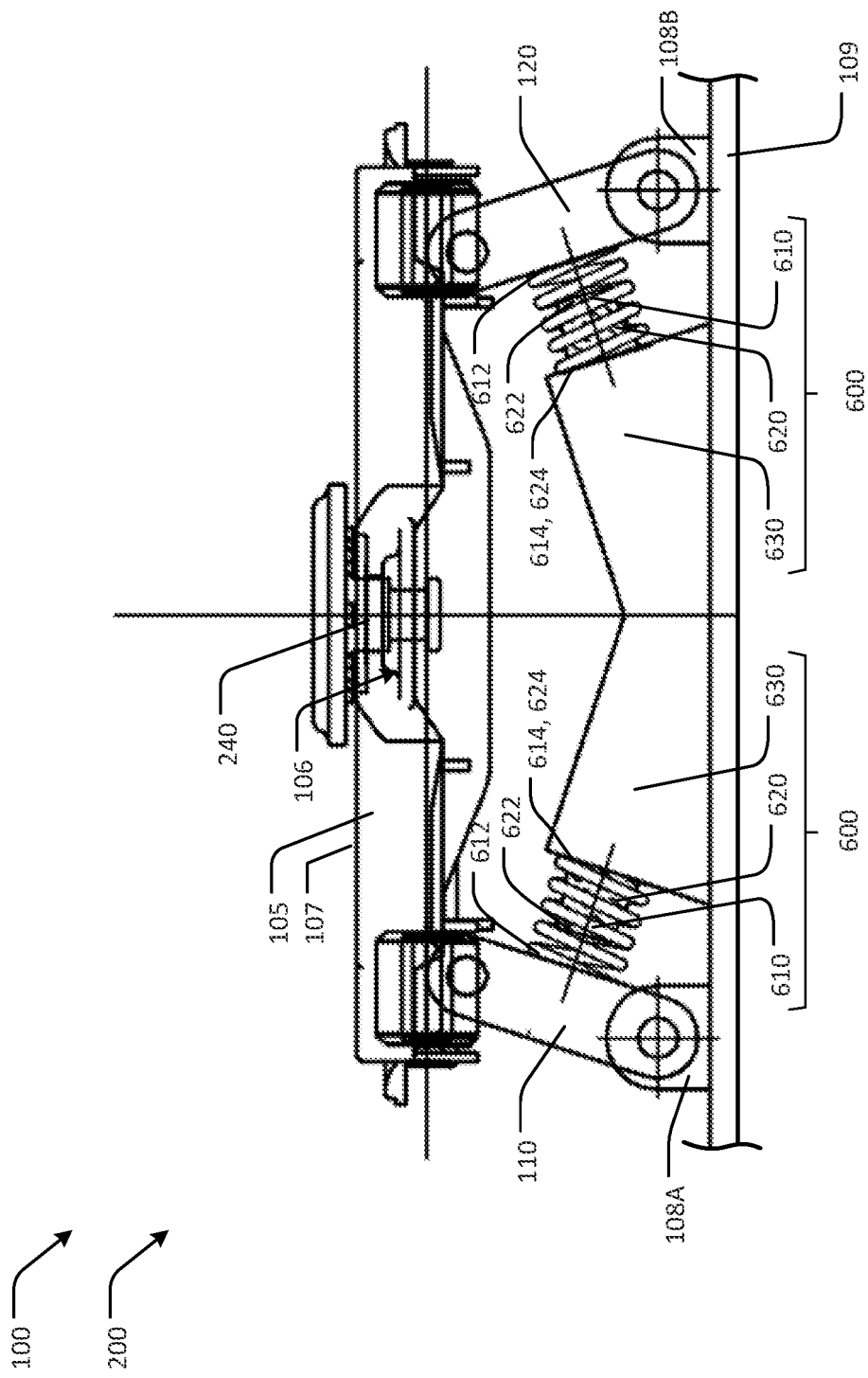
FIG. 6 is an end view showing the compensated fifth-wheel coupling according to some embodiments, including a further version of the limit assembly of FIG. 4.

Turning now to FIGS. 4, 5, and 6, the compensator 100 may further comprise a limit assembly configured to contact or exert a force on at least one of the first and second supports 110, 120 to restrict the movement of at least one of the supports 110, 120, and thereby limit the amount of roll movement of the coupler plate 105. For example, a void is defined underneath the coupler plate 105 and between the first and second supports 110, 120, so that movement of the supports 110, 120 is unimpeded and the compensator 100 may roll freely without obstruction. Accordingly, the limit assembly may be disposed between the first and second supports 110, 120 to limit the amount that the compensator 100 may roll. In some embodiments, the limit assembly comprises parts disposed outside of the first and second supports 110, 120. For example, the limit assembly may include components positioned to either lateral side outside of the first and second supports 110, 120.

In some embodiments, the limit assembly comprises magnets (such as a permanent and/or coiled wired electromagnet) arranged to apply a repulsive magnetic force to a corresponding magnet having the same polarity on the supports 110, 120. The use of magnets, such as neodymium magnets which provide a strong magnetic force in a compact size, allow the limit assembly to limit the amount of movement of the supports 110, 120 without physically contacting the supports 110, 120. This may reduce wear and tear on the supports 110, 120 compared to a limit assembly which relies on physical contact to restrict movement. The use of magnets provides a hard stop when the rotation of the supports 110, 120 moves the opposing magnets into their respective magnetic field.

In some embodiments, the limit assembly comprises a torsion bar installed in place of at least one of the mounting pivots 112, 122. The torsion bar may comprise a bearing fitted on a splined shaft to provide a limited amount of rotation at the mounting pivots 112, 122, with further rotation limited by the torsional strength of the torsion bar. The torsion bar may be used in combination with a hard stop (such as shown in FIG. 4) to physically limit free rotation of the supports 110, 120 beyond the allowable amount of torsion for the torsion bar. The torsion bar arrangement may provide a compact and an unobtrusive means of limiting the rotation of the supports 110, 120.

FIG. 4 shows an embodiment of the compensator 100 with a first embodiment of the limit assembly 400, FIG. 5 shows an embodiment of the compensator 100 with a second embodiment of the limit assembly 500, and FIG. 6 shows an embodiment of the compensator 100 with a third embodiment of the limit assembly 600. The limit assembly 400, 500, 600 is disposed between the first and second supports 110, 120.

In some embodiments, the limit assembly 400, 500, 600 comprises a first limit member 410, 510, 610. The first limit member 410, 510, 610 may be connected to the mounting platform 109 or to the mounting structure 108. The connection may be a rigid connection so that the first limit member 410, 510, 610 does not move relative to the towing vehicle unit when a force is applied. The first limit member 410, 510, 610 may be configured to directly or indirectly engage with one of the first or second supports 110, 120. For example, the first limit member 410, 510, 610 may directly contact or be connected to the first and/or second support 110, 120 to direct at least part of the forces from movement of the first and/or second support 110, 120 into the first limit member 410, 510, 610. The first limit member 410, 510, 610 may resist the movement of the first and/or second support 110, 120. The resistance provided by the first limit member 410, 510, 610 may be via an absorber or a progressively increasing resistive load which precisely controls the forces and moments transmitted through the fifth-wheel coupling acting between towing and towed vehicle units.

In some embodiments, the first limit member 410, 510, 610 indirectly contacts the first and/or second support 110, 120 via a separate structure, for example a second limit member 420, 520, 620. The limit assembly 400, 500, 600 may comprise the second limit member 420, 520, 620. The second limit member 420, 520, 620 may directly contact or be connected to the first limit member 410, 510, 610 and to the first and/or second support 110, 120. In some embodiments, the first and second limit members 410, 420, 510, 520, 610, 620 are connected in series, so that movement of the first and/or second support 110, 120 deforms the first and/or second limit members 410, 420, 510, 520, 610, 620. In some embodiments, the first and second limit members 610, 620 are connected in parallel, as shown in FIG. 6, so that movement of the first and/or second support 110, 120 initially deforms the first limit member 610 and then engages and deforms the second limit member 620 which provides a further resistive load.

As shown in FIG. 4, the limit assembly 400 is spaced apart from the first and second supports 110, 120 when the coupler plate 105 is in the neutral position 200. This spacing allows some initial movement (for example, leftward or rightward movement) of the coupler plate 105 before one of the first or second supports 110, 120 contacts the limit assembly 400 so that further movement is substantially resisted or is substantially prevented. Movement of the coupler plate 105, for example towards the left, causes the second support 120 to compress and deform the adjacent first limit member 410. The leftward movement may also compress and deform the second limit member 420 connected in series to the first limit member 410. Similar compression and deformation of the limit members 410, 420 applies with rightward movement of the fifth-wheel coupling 104.

In some embodiments, at least one of the first and second limit members 410, 420 may be elastically deformable to absorb kinetic energy when contacted by the first and/or second support 110, 120. For example, at least one of the first and second elastically deformable limit members 410, 420 may be a spring such as a coil spring or a torsion bar, a rubber block ("snubber block"), or a bushing such as a urethane bushing. The first elastically deformable limit member 410 may have the same spring constant as the second elastically deformable limit member 420 so that the limit members 410, 420 deform at the same rate for a given force. Alternatively, the first elastically deformable limit member 410 may have a different spring constant to the second elastically deformable limit member 420.

In the embodiment of the limit assembly 400 shown in FIG. 4, the first limit member 410 is an elastically deformable snubber block and the second limit member 420 is a rigid (or substantially less elastically deformable) structure, for example made from steel and connected to the mounting platform 109. This configuration of the limit assembly 400 allows some initial free movement of the coupler plate 105, and a controlled non-linear hard stop when the coupler plate 105 reaches the limit of its travel as contact is made with limit assembly 400 as described earlier.

FIG. 5 shows the second embodiment of the limit assembly 500 comprising first and second limit members 510, 520. The first and second limit members 510, 520 are functionally equivalent to the first and second limit members 410, 420, in that they act to restrain lateral movement of the first and second supports 110, 120. At least one of the first and second limit members 510, 520 may be elastically deformable, for example wherein the first limit member 510 is elastically deformable, and the second limit member 520 is a rigid (or substantially less elastically deformable) structure connected to the mounting platform 109 and/or to the mounting structure 108.

Unlike the first embodiment 400, the second embodiment 500 of the limit assembly is not spaced apart from the first or second supports 110, 120. In some embodiments, the first limit member 510 is a coil spring having a first end 512 in contact with the first and/or second supports 110, 120 so that the first and/or second supports 110, 120 have no initial free movement, compared to the limit assembly 400. With the limit assembly 500, movement of the fifth-wheel coupling 104, for example towards the left, causes the second support 120 to compress and deform the right-sided first limit member 510. The spring 510 may comprise a second end 514 disposed opposite the first end 512, wherein the first end 512 is in contact with the first and/or second supports 110, 120, and the second end 514 is in contact with the second limit member 520, so that the second limit member 520 may be said to be connected in series to the first limit member 510. Accordingly, the leftward movement may compress and deform both the first limit member 510 and the right-sided second limit member 520 when connected in series.

In some embodiments, the first limit member 510 is connected to the first and second supports 110, 120. As the first limit members 510 are connected to respective first and second supports 110, 120 and arranged as an opposed pair, movement of the fifth-wheel coupling 104, for example towards the left, compresses the right-sided first limit member 510 and extends the left-sided first limit member 510. The extension and compression of the pair of opposed first limit members 510 may provide an initial preload force which biases the coupler plate 105 to remain in the neutral position 200 until a lateral or roll force is applied. The preload force may bias the coupler plate 105 to return to the neutral position 200 when the lateral or roll force is reduced or removed.

The resistance resulting from the extension and compression of the pair of opposed first limit members 510 may be approximately double the resistance provided by the arrangement where the first limit members 510 are not connected to the first and second supports 110, 120. For example, the first limit member 510 may not be attached to the first support 110, so that during said leftward movement the left-sided first limit member 510 is not stretched, and resistance to lateral movement of the coupler plate 105 is provided by only the right-sided first limit member 510. In some embodiments, the first limit member 510 may be attached to the first and/or second support 110, 120 so that both of the first limit members 510 may resist the lateral movement of the coupler plate 105.

FIG. 6 shows the third embodiment of the limit assembly 600 comprising first and second limit members 610, 620. The first and second limit members 610, 620 are functionally equivalent to the first and second limit members 410, 420, 510, 520. The limit assembly 600 comprises elastically deformable first and second limit members 610, 620, wherein the second limit member 620 is nested within the first limit member 610 so that they may be said to be connected in parallel.

The first limit member 610 comprises a first end 612 in contact with the first and/or second supports 110, 120 so that the first and/or second supports 110, 120 have no initial free movement, compared to the limit assembly 400. The second limit member 620 comprises a first end 622, which in some embodiments is in contact with the first and/or second supports 110, 120 so that the first and second limit members 610, 620 deform simultaneously. In some embodiments, the first end 622 is spaced apart from the first and/or second supports 110, 120 so that the first limit member 610 deforms before the second limit member 620. The first limit member 610 may be a coil spring, and the second limit member 620 may be a snubber block, for example.

The limit assembly 600 comprises a third limit member 630, which may be a rigid structure such as a steel block attached to the mounting structure 108 or to the mounting platform 109. The first and second limit members 610, 620 comprise respective second ends 614, 624 disposed opposite respective first ends 612, 622. At least one of the second ends 614, 624 is in contact with the third limit member 630. In some embodiments, both of the second ends 614, 624 are in contact with the third limit member 630.

Similar to the limit assembly 500, in some embodiments the first end 612 of both first limit members 610 are connected to the first and second supports 610, 620 to provide the preload force as discussed above. In some embodiments, the first end 612 and the first end 622 of both the first and second limit members 610, 620 are connected to the first and second supports 610, 620 to provide the preload force.

Regardless of their composition or configuration, the function of the limit members 410, 420, 510, 520, 610, 620 should be understood to act to control roll movement and dampen the force transmitted from the coupler plate 105 between the towed and towing vehicle units. The various embodiments of the limit assembly 400, 500, 600 are examples of the possible customisation options of the compensator 100 to match the lateral and roll resistance characteristics of the compensated fifth-wheel coupling with the suspension of the articulated vehicle.

In use, embodiments of the compensator 100 connect a towing vehicle unit and a towed vehicle unit to form an articulated vehicle. For example, in a prime mover and semi-trailer example, the two vehicle units are connected to each other through a fifth-wheel coupling. By changing the roll centre height of the coupler plate 105, the roll axis of the towed semi-trailer when the coupler plate 105 is in the neutral position 200 may be shifted relative to the centre of gravity of the towed semi-trailer. When the centre of gravity is below the roll-axis, improved compensation of roll-movements of the towed semi-trailer can be expected, compared to conventional compensated fifth-wheel couplings or uncompensated fifth-wheel couplings, when the articulated vehicle laterally changes direction or travels over an uneven surface.

In the embodiments of FIGS. 4 to 6, the limit members 410, 420, 510, 520, 610, 620 are able to be in contact with the first and second supports 110, 120. Specifically, the limit members 410, 510, 610 are configured to be connected to or be in contact with the first support 110 at a point between the mounting pivot 112 and the coupling pivot 114, and/or connected to the second support 120 between the mounting pivot 122 and the coupling pivot 124. The resistance provided by the limit members 410, 420, 510, 520, 610, 620 imparts a lateral load on the supports 110, 120.

In some embodiments of the limit assembly 400, 500, 600, the limit members 410, 510, 610 are instead configured to be connected to or be in contact with the first support 110 at or near the first coupling pivot 114, and/or connected to or be in contact with the second support 120 at or near the second coupling pivot 124. For example, the limit members 410, 510, 610 are connected to the supports 110, 120 at or near the coupling pivots 114, 124 via the trunnion 140. This provides an alternative load path for the forces causing the rolling/tilting of the coupler plate 105, and removes or at least reduces the aforementioned lateral loads from being directly applied to the supports 110, 120.

Figure 12A:
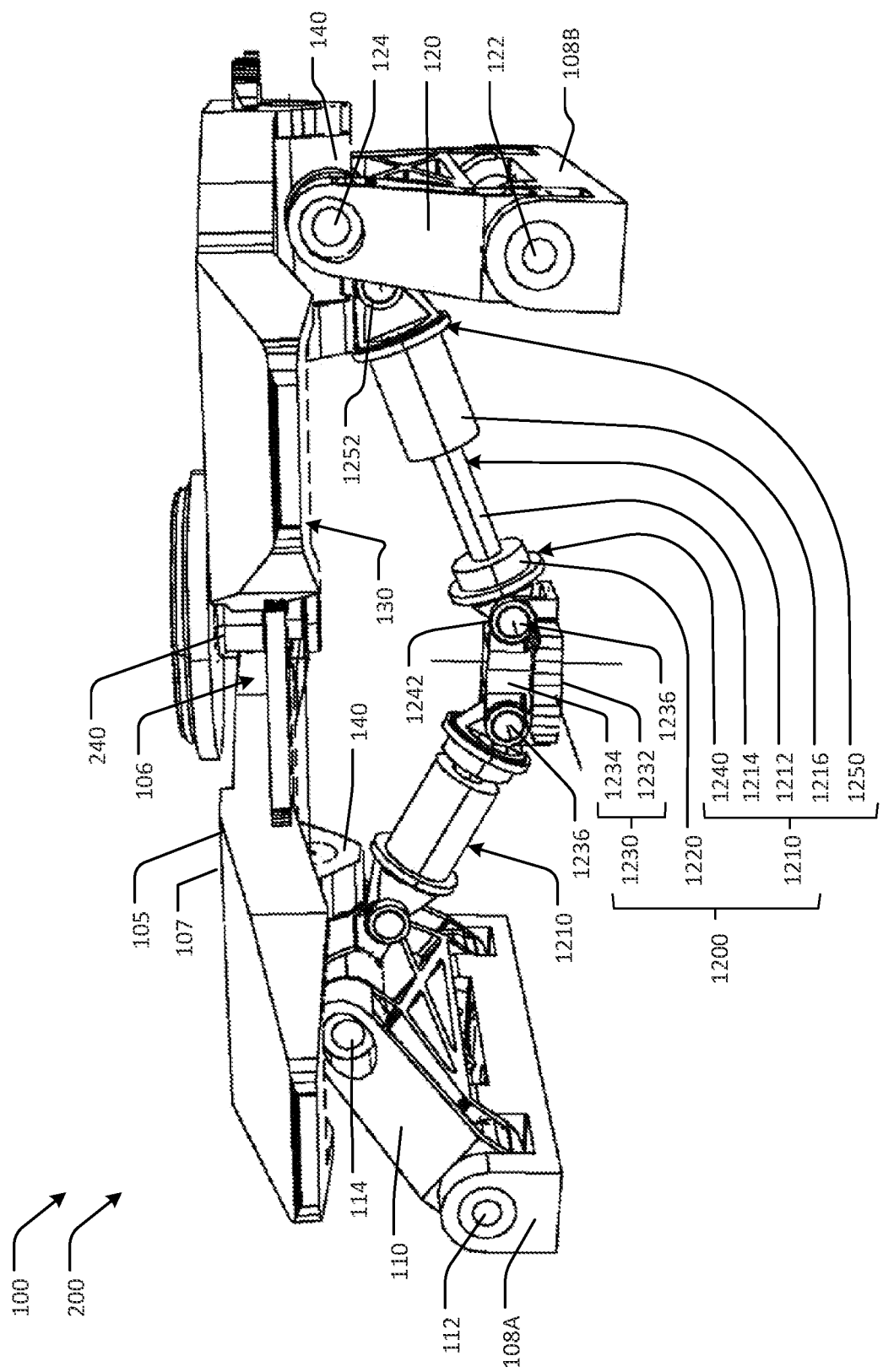
FIG. 12A is a perspective view of the compensated fifth-wheel coupling, including a limit assembly for restricting the lateral or roll movement of the compensated fifth-wheel coupling, according to some embodiments.
Figure 12B:
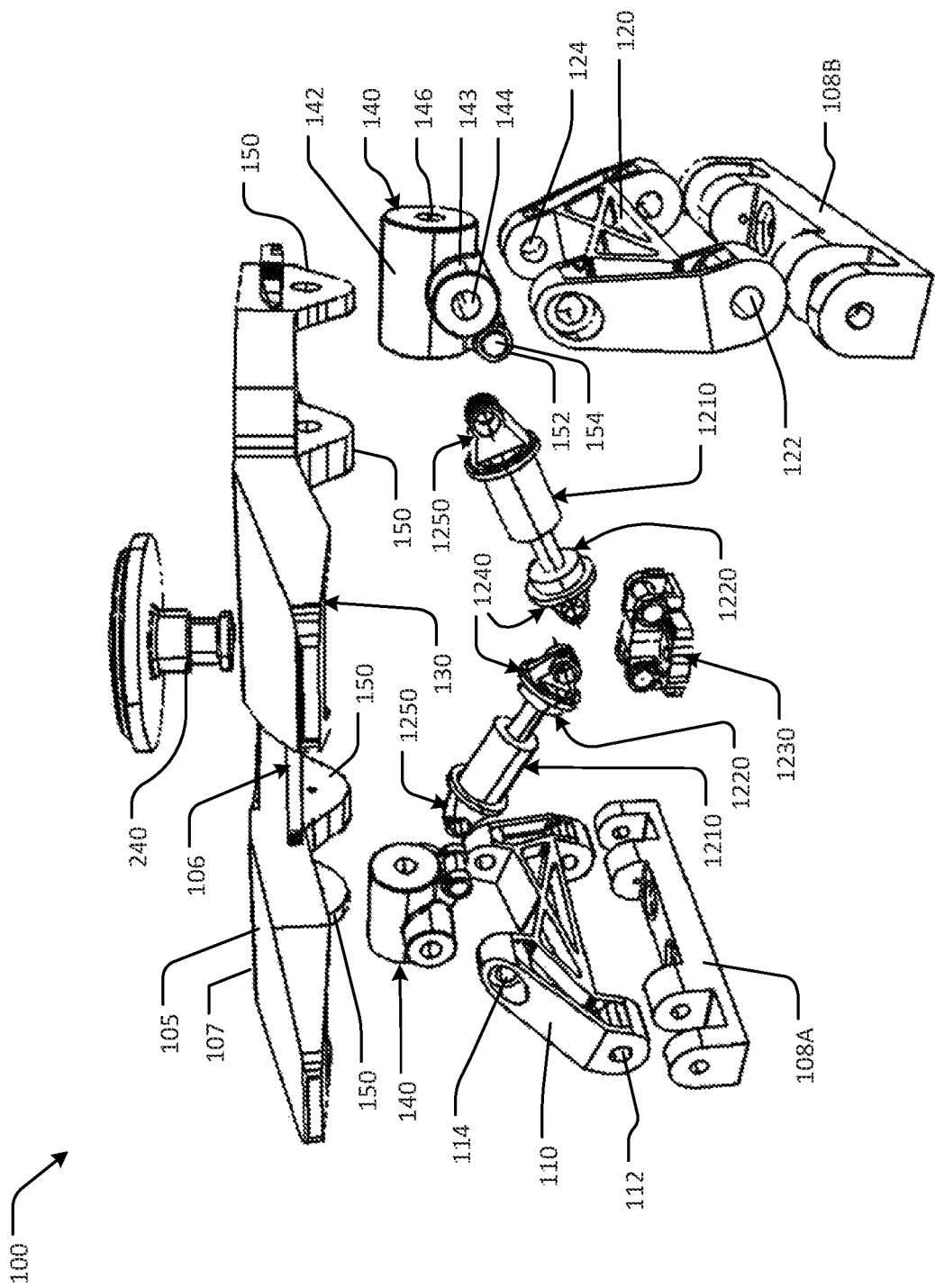
FIG. 12B is an exploded view of the compensated fifth-wheel coupling of FIG. 12A.

FIGS. 12A and 12B show an embodiment of a limit assembly 1200 comprising a first elastically deformable limit member 1210. FIG. 12B is an exploded view of FIG. 12A. The limit assembly 1200 is disposed in the void defined underneath the coupler plate 105 and between the first and second supports 110, 120. The first elastically deformable limit member 1210 may comprise a damper 1212, such as a hydraulic damper or pneumatic piston. In some embodiments, the damper 1212 is or includes a magnetic or electromagnetic damper. In some embodiments, the damper 1212 is a linear damper that comprises a piston 1214 and a damper body 1216 defining a plurality of chambers (not shown) for containing a fluid or gas, such as hydraulic fluid or air. This fluid or gas may be compressible. In some embodiments, the damper 1212 is or includes a non-linear damper. The linearity of the damper may refer to the nature of the damping; for example, a linear damper provides a constant proportional relationship (damping coefficient) between the damping force and the speed of compression or extension of the piston 1214, whereas a non-linear damper provides a varying damping coefficient. Compression or extension of the piston 1214 moves the piston 1214 relative to the damper body 1216, thereby moving the fluid or gas between the chambers within the damper body 1216. The movement of the fluid or gas provides resistance to the compression or extension of the piston 1214.

Rolling or tilting movement of the coupler plate 105 is thereby resisted by extension or compression of the damper 1212. As shown in FIGS. 12A and 12B, two of the first elastically deformable limit member 1210 (damper 1212) cooperates to control the tilting movement of the coupler plate 105, wherein when one of the damper 1212 is compressed, the other one of the damper 1212 is extended. In some embodiments of the compensator 100, only one of the limit members 1210 (and optionally one damper 1212) is present. Use of a single limit member 1210 and damper 1212 is possible since the same limit member 1210 can be used to limit or resist movement of the first support 110 or the second support 120 in both lateral directions, since the limit member 1210 is connected, coupled or anchored to both the support 110 or 120 and the mounting platform 109 (via base plate 1232). Use of a single limit member 1210 may take up less space overall than two limit members 1210 and may involve lower cost, when considering the other components required for attaching the damper 1212 to the coupler plate 105. However, the provision of two dampers 1212 may allow each individual damper 1212 to be smaller than a single larger damper 1212. The provision of two dampers 1212 also provides redundancy in the event of failure of one of the dampers 1212. Similarly, some embodiments of the limit assembly 500 and 600 may employ only a single limit member 510 or 610, where that limit member is suitably strong yet suitably deformable to resist roll of the coupler plate 105, and is connected, coupled or anchored to both the support 110 or 120 and/or the mounting platform 109.

The limit assembly 1200 may comprise a second elastically deformable limit member 1220, such as a bump stop, which limits the compression of the damper 1212. The bump stop 1220 may be located at a distal end of the piston 1214 so that it abuts the damper body 1216 when the piston 1214 is fully retracted into the damper body 1216.

The limit assembly 1200 may comprise a third elastically deformable limit member 1230, which may be a base mount. The base mount 1230 may be a rigid structure attached to the mounting structure 108 or to the mounting platform 109. The base mount 1230 comprises a base plate 1232 and a flange 1234 extending from the base plate 1232. In some embodiments, the flange 1234 defines a hole or aperture configured to receive a coupling pin 1236 so that the first limit member 1210 can be pivotally connected to the base mount 1230. The flange 1234 may define a plurality of holes to enable a plurality of the first limit member 1210 to be pivotally connected to the base mount 1230.

In some embodiments, the first elastically deformable limit member 1210 further comprises a first end portion 1240. The first end portion 1240 is disposed at a first end of the damper 1212 and is configured to allow the damper 1212 to be pivotally connected to the base mount 1230. In some embodiments, the first limit member 1210 further comprises a second end portion 1250. The second end portion 1250 is disposed at an opposite second end of the damper 1212 and is configured to allow the damper 1212 to be pivotally connected to (or near to) at least one of the coupling pivots 114, 124 via the trunnion 140, such as by pins 115, 125 at the pivots 114, 124. This may allow the damper 1212 to indirectly exert, via the trunnion 140 and through pins 115, 125 at the pivots 114 and 124, a force or moment on at least one of the first and second supports 110, 120 to restrict their movement.

The structure of the trunnion 140 is more clearly visible in the exploded view of FIG. 12B. The embodiment of the trunnion 140 shown in FIG. 12B is separate to the coupler plate 105, and may be attached thereto via mounting lugs 150 projecting from the underside 130 of the coupler plate 105.

The trunnion 140 comprises a trunnion body 142, which defines a roll aperture 144 for receiving a roll axle or roll pin 115, 125 (not shown) to connect the trunnion 140 to the supports 110, 120 and thereby enable the coupler plate 105 to roll about the coupling pivots 114, 124. The trunnion body 142 may comprise a protrusion or boss 143, which extends away from the trunnion body 142 and further defines the roll aperture 144. The trunnion body 142 further defines a pitch aperture 146 for receiving a pitch axle or pitch pin 117, 127 (not shown) to connect the trunnion 140 to the coupler plate 105 (via the mounting lugs 150) to enable the coupler plate 105 to pitch about the coupling pivots 116, 126. The trunnion body 142 defines the roll aperture 144 and the pitch aperture 146 to be perpendicular to each other.

The portion of the trunnion body 142 defining the roll aperture 144 (such as the boss 143) may be substantially cylindrical to facilitate the rolling movement of the coupler plate 105 when the trunnion 140 is connected to the supports 110, 120. The portion of the trunnion body 142 defining the pitch aperture 146 may be substantially cylindrical to facilitate the pitching movement of the coupler plate 105 when the trunnion 140 is connected to the mounting lugs 150.

The trunnion body 142 further comprises a connector 152 for connecting the first elastically deformable limit member 1210 to the trunnion 140. The connector 152 is disposed adjacent to the roll aperture 144 so that rolling movement of the supports 110, 120 is transferred into axial compression or extension of the first elastically deformable limit member 1210.

The connector 152 has a connector body that defines a connector aperture 154 for receiving a pin or bolt (not shown). When this pin or bolt is received in the connector aperture 154, the second end portion 1250 (and thus the damper 1212) is connected to the trunnion 140. When the limit members 1210 (dampers 1212), trunnions 140, and coupler plate 105 are connected, the connectors 152 are disposed adjacent to the respective first and second coupling pivots 114, 124.

The second end portion 1250 comprises a second rod end bearing (rose joint) 1252 which allows multi-axis rotation. Similarly, the first end portion 1240 comprises a first rod end bearing (rose joint) 1242 which allows multi-axis rotation. The first and second rod end bearings 1242, 1252 may be identical.

The first and second rod end bearings 1242, 1252 allow rolling or tilting movement of the coupler plate 105 to be resisted by the damper 1212 while providing the rotational freedom necessary to enable the coupler plate 105 to move. The first and second rod end bearings 1242, 1252 each comprise a ball swivel that defines a hole for receiving a pin or bolt, such as the coupling pin 1236 to connect to the flange 1234 of the base mount 390. The ball swivel is rotatably contained within a housing. The housing may comprise a flange to allow the damper 1212 to be connected thereto.

The first and second rod end bearings 1242, 1252 allow the damper 1212 to rotate its alignment in response to the sideways or tilting movement of the coupler plate 105. This allows the forces from the coupler plate 105 to be substantially transmitted along the longitudinal axis of the damper 1212. In other words, movement of the coupler plate 105 is substantially translated into extension or compression of the damper 1212 (pure axial loading), instead of being substantially translated into bending or torque along the longitudinal axis of the damper 1212.

Figure 13:
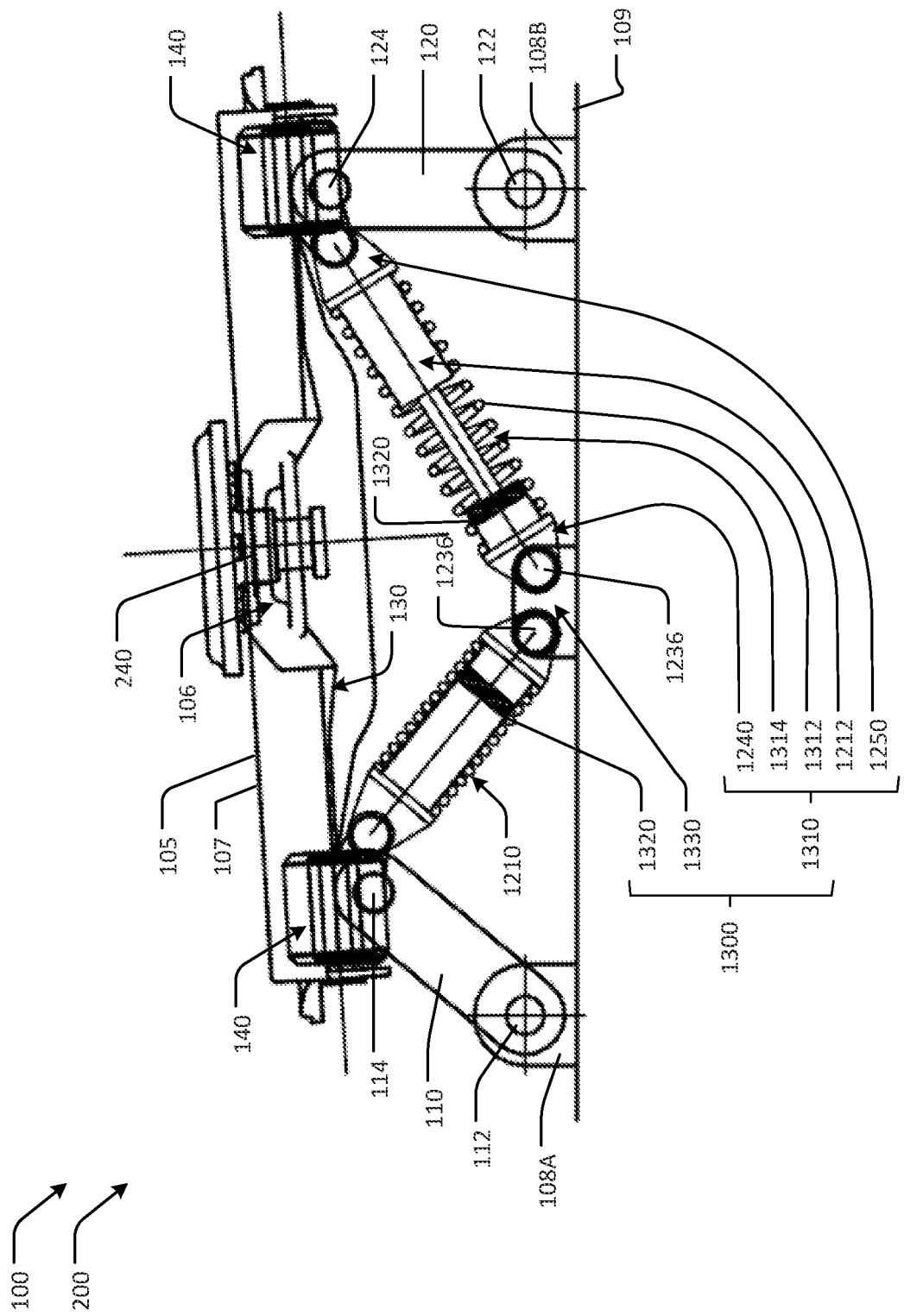
FIG. 13 is an end view of the compensated fifth-wheel coupling, including a further embodiment of the limit assembly of FIGS. 12A and 12B.

FIG. 13 shows (in section view for clarity) an embodiment of the limit assembly 1300 comprising a first elastically deformable limit member 1310, second elastically deformable limit member 1320, and third elastically deformable limit member 1330. In some embodiments, the first elastically deformable limit member 1310 comprises the damper 1212 and a coil spring 1312. The coil spring 1312 comprises an elastically deformable material which is wound in a helix to define a lumen 1314 within the helix. The damper 1212 is positioned in the lumen 1314 and connected to the coil spring 1312 so that extension or compression of the coil spring 1312 can be resisted by extension or compression of the damper 1212. Positioning the damper 1212 in the lumen 1314 of the coil spring 1312 provides a more compact arrangement than positioning the damper 1212 outside the coil spring 1312.

The second elastically deformable limit member 1320 may be a bump stop 1320, which limits the compression of the damper 1212 and/or the coil spring 1312. The bump stop 1320 may be largely identical to the bump stop 1220. The third elastically deformable limit member 1330 may be the base mount 1230.

In some embodiments, the first elastically deformable limit member 1310 further comprises the first end portion 1240. In the limit assembly 1300, the first end portion 1240 is configured to allow the damper 1212 and the coil spring 1312 to be pivotally connected to the base mount 1230. In some embodiments, the first elastically deformable limit member 1310 further comprises the second end portion 1250. The second end portion 1250 is configured to allow the damper 1212 and the coil spring 1312 to be pivotally connected to (or near to) at least one of the coupling pivots 114, 124 via the trunnion 140.

Similar to the limit assembly 1200, the limit assembly 1300 is disposed in the void defined underneath the coupler plate 105 and between the first and second supports 110, 120. Furthermore, in the limit assembly 1300 the first and second end portions 1240, 1250 enable the damper 1212 and the coil spring 1312 to rotate in response to the sideways or tilting movement of the coupler plate 105. This allows movement of the coupler plate 105 to be substantially translated into extension or compression of the damper 1212 and the coil spring 1312, instead of being substantially translated into bending or torque along the respective longitudinal axes of the damper 1212 and the coil spring 1312.

In some embodiments, extension or compression of the damper 1212 and the coil spring 1312 is simultaneous. In some embodiments, extension or compression of the damper 1212 and the coil spring 1312 occurs independently; for example, the coil spring 1312 may accommodate a limited amount of extension or compression before the damper 1212 is extended or compressed.

Similar to the embodiment of the limit assembly 1200 shown in FIGS. 12A and 12B, a pair of the limit assembly 1300 may operate to control the tilting movement of the coupler plate 105, wherein when one of the limit assembly 1300 is compressed, the other one of the limit assembly 1300 is extended. On the left side of FIG. 13, one damper 1212 and its coil spring 1312 is fully compressed, so that the damper 1212 is abutting the bump stop 1320. Meanwhile, the other damper 1212 and its coil spring 1312 is fully extended.

In some embodiments of the compensator 100, only one of the limit members 1310 (and optionally one damper 1212) is present. Use of a single limit member 1310 and damper 1212 is possible since the same limit member 1310 can be used to limit or resist movement of the first support 110 or the second support 120 in both lateral directions, since the limit member 1310 is connected, coupled or anchored to both the support 110 or 120 and the mounting platform 109 (via base plate 1232). Use of a single limit member 1310 may take up less space overall than two limit members 1310 and may involve lower cost, when considering the other components required for attaching the damper 1212 to the coupler plate 105. However, the provision of two dampers 1212 may allow each individual damper 1212 to be smaller than a single larger damper 1212. The provision of two dampers 1212 also provides redundancy in the event of failure of one of the dampers 1212.

The resistance to roll/tilt may be adjusted by selection of the damper 1212 and/or its coil spring 1312. For example, where a greater resistance is desired, a stiffer damper 1212 and/or coil spring 1312 can be interchanged. Compared to the coil spring 1312, the dampers 1212 may provide a finer degree of control and resistance to roll/tilt of the coupler plate 105. The finer degree of control and resistance provided by the dampers 1212 may be useful in instances where smaller or more gradual tilting movements of the coupler plate 105 occur. Conversely, the coil spring 1312 may provide an appropriate level of control and resistance in response to larger or sudden tilting movements of the coupler plate 105.

FIG. 7 shows an example of articulated vehicle 700. The articulated vehicle 700 comprises a prime mover 710 (the towing vehicle unit) connected to a semi-trailer 720 (the towed vehicle unit) using the fifth-wheel coupling 104. The coupler plate 105 may be operably integral to the compensator 100. The prime mover 710 has a first suspension roll centre 712 above the front steer axle, and a second suspension roll centre 714 above the rear driven axle, wherein a line joining the first suspension roll centre 712 and the second suspension roll centre 714 defines a prime mover roll axis 716. Similarly, the semi-trailer 720 has a third suspension roll centre 722 above the rear axle, and a fourth suspension roll centre 724 located on the prime mover roll axis 716 directly below the fifth-wheel coupling 104. A line joining the third suspension roll centre 722 and the fourth suspension roll centre 724 defines a semi-trailer roll axis 726.

The fourth suspension roll centre 724 is idealised and assumes both the prime mover 710 sprung mass and the connection to the front of the semi-trailer 720 through the fifth-wheel coupling 104 is perfectly rigid, consistent with a conventional (uncompensated) fifth-wheel coupling that has no (lash) roll freedom. Under this assumption, the sprung mass of semi-trailer 720 rotates about the semi-trailer roll axis 726. With the introduction of the compensator 100, the roll centre 230 of coupler plate 105 provides the semi-trailer with further roll freedom. The height of the roll centre 230 is adjustable between positions 230A and 230B, as described above with reference to FIGS. 3A and 3B, for example at 230AB.

As shown in FIG. 7, by way of example, the location of the roll centre 230A designates the maximum height of the roll centre 230 of compensator 100 fifth-wheel coupling 104. The roll centres 230A and 722 define a roll axis 728A of the fifth-wheel coupling 104. By way of example, the location of the roll centre 230B designates the minimum height of the roll centre 230 of the fifth-wheel coupling 104 when installed on the mounting platform 109 located on a rear portion of the prime mover 710. The roll centres 230B, 722 define a roll axis 728B. The roll centre 230 of the fifth-wheel coupling 104 may also be adjusted to a position 230AB located between the highest roll centre 230A and the lowest roll centre 230B, wherein the roll centres 230AB, 722 define a roll axis 728AB. The location of the centre of gravity of the semi-trailer 720 may vary depending on the configuration of the chassis of the semi-trailer 720 and/or the goods transported on the semi-trailer 720. For example, the semi-trailer 720 when unloaded may have a centre of gravity 730A, and the semi-trailer 720 when loaded may have a centre of gravity 730B, wherein the centre of gravity 730A is located closer to the ground than 730B.

The roll characteristics of the prime mover 710 are different to the roll characteristics of the semi-trailer 720. The semi-trailer 720 carries a greater load and also has a higher sprung mass centre-of-gravity than the prime mover 710. The greater sprung mass of the semi-trailer 720 means that the suspension of the semi-trailer 720 is designed to have a greater roll-stiffness than the roll-stiffness of the suspension of the prime mover 710. The lower roll stiffness of the prime mover 710 allows the prime mover 710 to keep its wheels in contact with ground for steering and to provide good traction under a range of road conditions.

The type of load carried by the semi-trailer 720 may also affect the location of the centre of gravity of the sprung mass, and thereby affect the roll characteristics of the semi-trailer 720. For example, if the semi-trailer 720 carries a tank of liquid (such as a bulk tank of petrol), the sloshing movement of the liquid results in movement of the centre of gravity of the semi-trailer 720, even with the presence of baffles. Reducing the distance between the centre of gravity and the roll axis reduces the amount of roll induced by the movement of the centre of gravity as the moment arm is shorter, which in turn improves the stability of the vehicle 700 when the vehicle 700 changes direction or travels over an uneven surface. A shorter moment arm means that a larger lateral force (from the movement of the centre of gravity of the sprung mass) would be required to induce the same amount of roll about the roll axis as would be induced by a smaller lateral force operating a longer moment arm.

Notably, for embodiments where the compensator 100 allows for manual adjustment of the rest angles 310, 320 of the first and second supports, the compensator 100 allows for the position of the roll axis to be adjusted once the weight of the semi-trailer 720 to be towed is determined. For example, knowing the weight of the semi-trailer 720 when loaded, the location of the loaded centre of gravity 730B can be determined, and the position of the roll centre 230 can be set to a position (such as corresponding to the roll centre 230A) to define a location of the roll axis 728A which reduces the moment arm of the centre of gravity 730B. This may also reduce maintenance costs; for example, the compensator 100 may absorb the rolling forces and thereby reduce the amount of rolling forces that would otherwise be transferred to the fifth-wheel coupling 104 or to the suspension of vehicle 700.

The location of the sprung mass centre-of-gravity 730 (730A, 730B) with respect to the roll axis 728 (728A, 728AB and 728B) is relevant to proper setup and operation of the compensator 100 so as to obtain an appreciable improvement in rollover stability. If the centre-of-gravity is above the roll axis 728 (for example, as shown by 730B) then the overturning moment loading will be in a direction that is opposite that if the centre-of-gravity is below the roll axis 728 (for example, as shown by 730A). A compensator design which only considers the position of the centre of mass relative to roll centre 230, and does not factor in the location of the semi-trailer centre-of-gravity 730 relative to the semi-trailer roll axis 728, can lead to less than optimum improvements in rollover stability. For example, FIG. 7 shows that the centre-of-gravity 730A is at the same height as roll centre 230B but it is above roll axis 728B. For the centre-of-gravity 730A a more favourable rollover stability outcome would be consistent with compensator roll centre at 230AB or 230A, which puts the roll axis 728AB and 728A above the centre-of-gravity 730A. In a similar way, the higher centre-of-gravity 730B would gain progressively increasing benefit from roll centres 230B, 230AB and 230A, respectively, consistent with a progressively increasing upward tilt of roll axis 728 and a decreasing moment (decreasing distance from the centre-of-gravity to the roll axis). These findings have been found to be consistent with the results of sophisticated whole-of-vehicle numerical modelling performed by the inventors.

The further benefit of compensator 100 and favourable location of the centre-of-gravity 730 relative to the roll axis 728, is the ability to redirect the overturning moment away from the suspension with the higher roll stiffness and distribute it more favourably between participating suspensions to improve rollover stability. This can be done in at least two ways, through optimisation of the location of the centre-of-gravity 730 relative to roll-axis 728, and by optimising the characteristics of components 400, 500, 600, 1200 and 1300 described earlier and shown in FIGS. 4, 5, 6, 12A and 13.

It is important to note that any free-play in the fit of the kingpin 240 in the coupler plate 105 introduces an additional amount of roll freedom, which may be effectively modelled as another roll centre (not shown in FIG. 7) at the point of connection between the kingpin 240 and the coupler plate 105. That is, for a conventional fifth-wheel coupling that has some lash, roll rotation of the semi-trailer sprung mass comprises two rotations, namely one about roll axis 726, and a second rotation about an axis running from 722 through the kingpin 240 to the coupler plate 105 roll centre 230. Rotation of the sprung mass 730 due to turntable lash has a destabilising effect, leading to a reduction in vehicle rollover stability. Therefore, when possible turntable lash should be removed entirely or reduced to a minimum. In some embodiments, the compensator 100 allows lash to be removed entirely while providing for sufficient roll freedom between the roll-coupled vehicle units to accommodate most in-service road and uneven terrain conditions encountered frequently by freight vehicles.

Figure 8A:
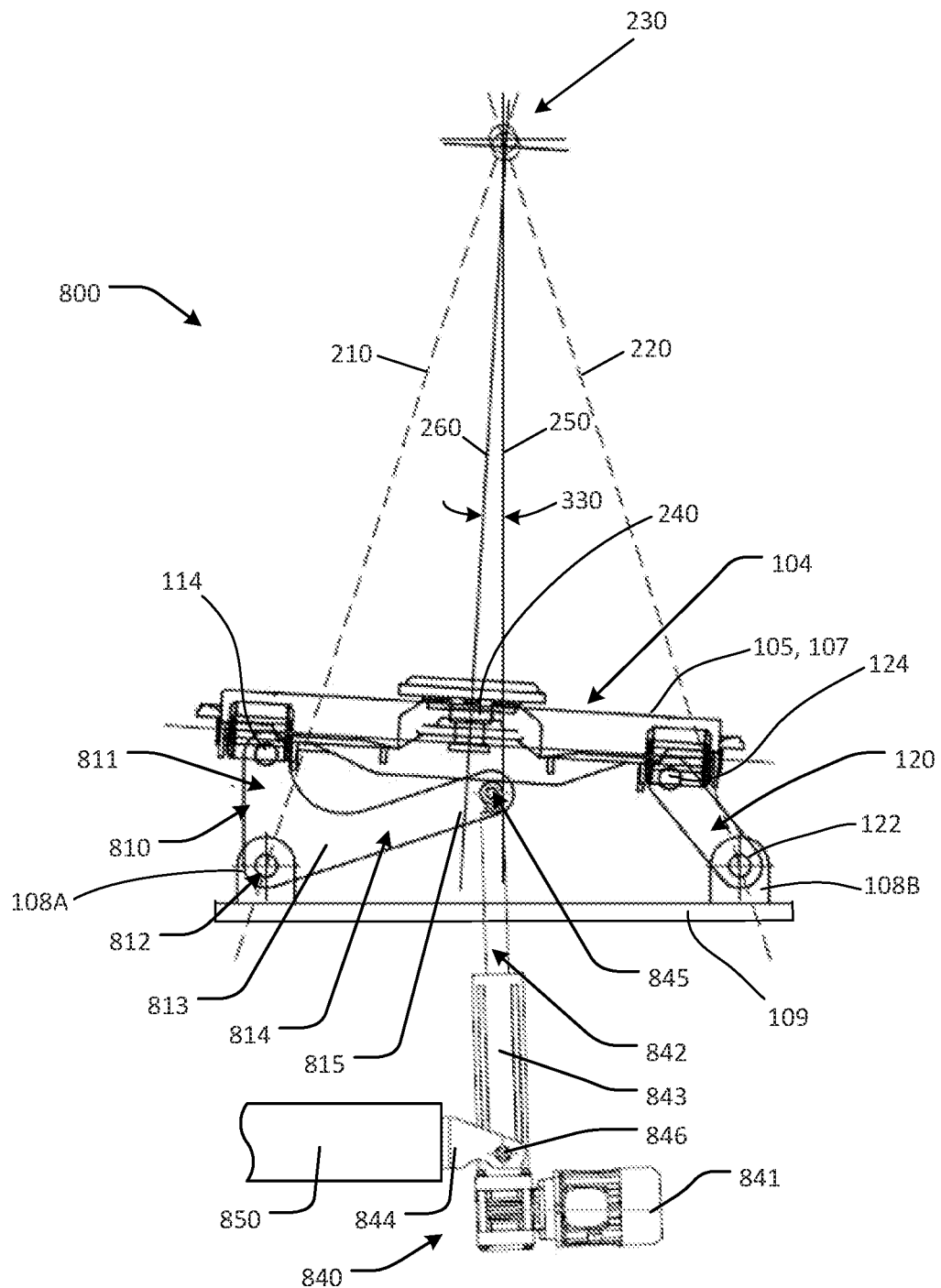
FIG. 8A is an end view of an automatically-compensated fifth-wheel coupling, comprising the compensated fifth-wheel coupling of FIGS. 1A to 3D and an automatic actuation system, incorporating active (forced) movement control, wherein the automatically-compensated fifth-wheel coupling is in a first tilted position similar to FIG. 3C.
Figure 8B:
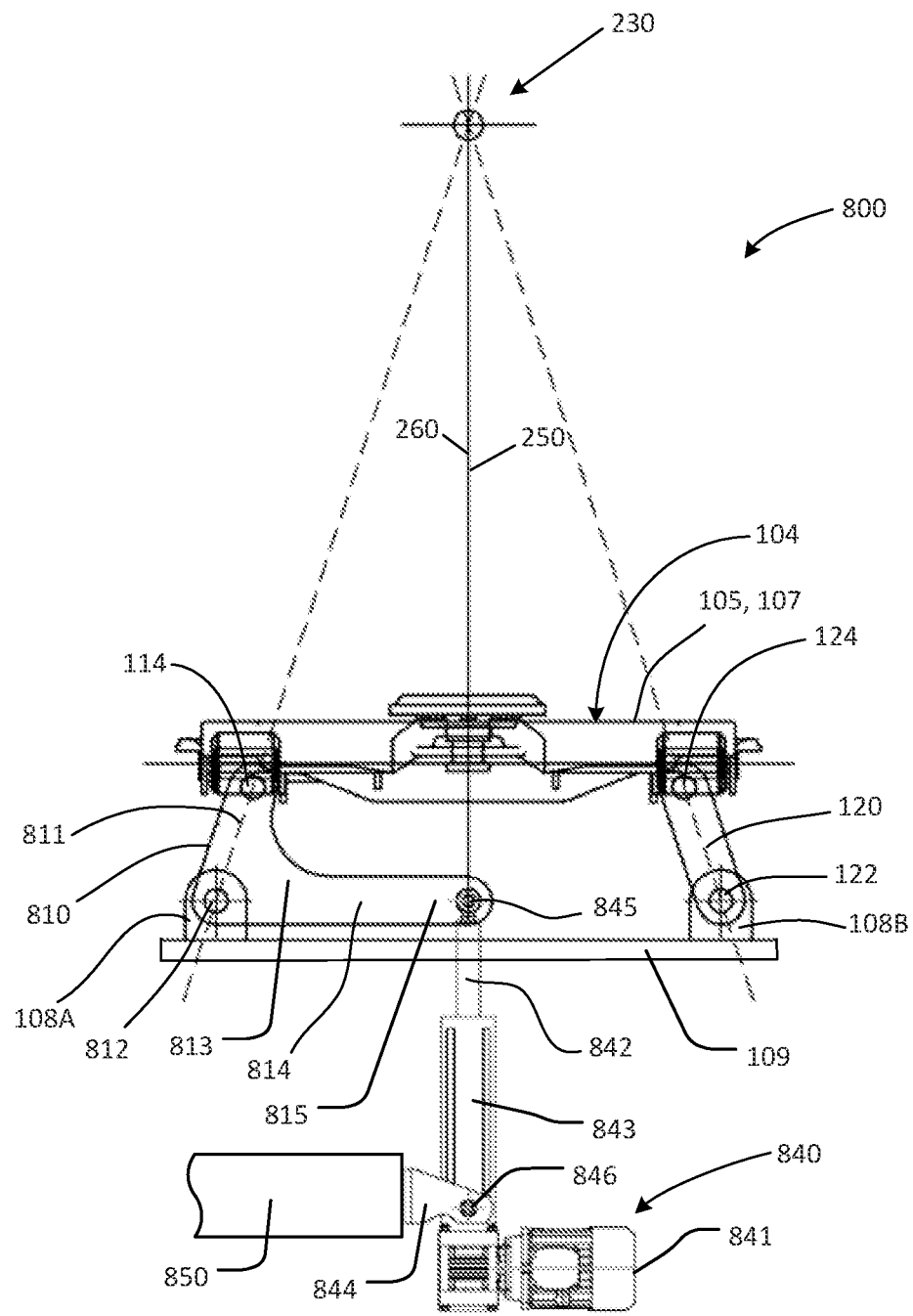
FIG. 8B is an end view showing the automatically-compensated fifth-wheel coupling of FIG. 8A in a neutral position similar to FIGS. 3A and 3B.
Figure 8C:
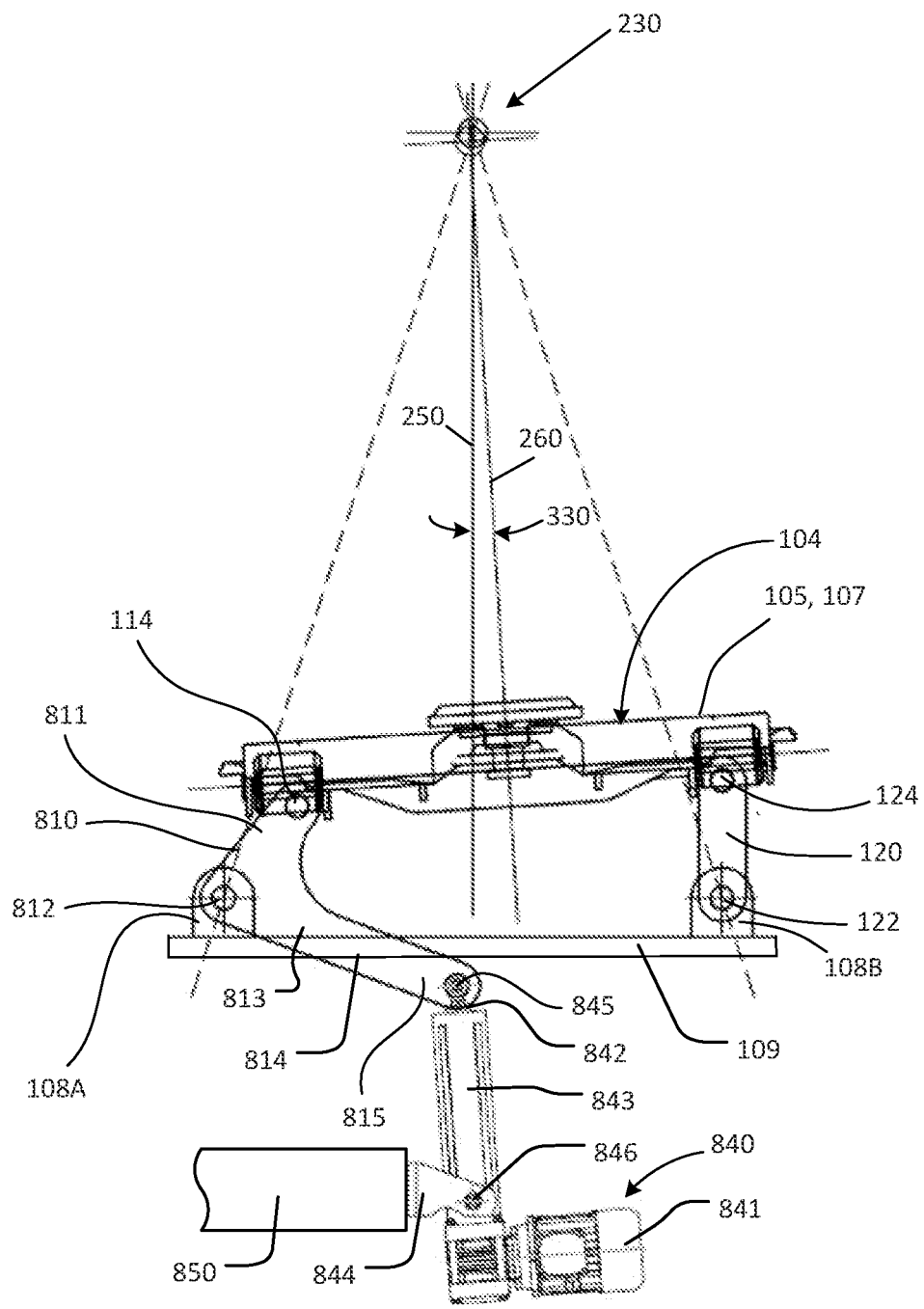
FIG. 8C is an end view showing the automatically-compensated fifth-wheel coupling of FIG. 8A in a second tilted position similar to FIG. 3D.

FIGS. 8A-8C show an automatic compensator 800, according to some embodiments, for compensating the roll movement of the fifth-wheel coupling 104 by using active movement control, wherein the compensator 800 is shown in a variety of roll positions. The compensator 800 comprises many of the same components as the compensator 100. For example, the compensator 800 comprises a first support 810 which is analogous to the first support 110. Like the first support 110, the first support 810 is attached to the fifth-wheel coupling 104 at the first coupling pivot 114. The first support 810 is attached to the bracket 108A via a first mounting pivot 812. The first mounting pivot 812 is analogous to the first mounting pivot 112. The compensator 800 further comprises the second support 120, which as disclosed above in relation to the compensator 100, is connected to the fifth-wheel coupling 104 at the second coupling pivot 124 and to the bracket 108B via the second mounting pivot 122. The fifth-wheel coupling 104 is able to move side-to-side (roll), relative to the mounting plate 109, via the pivoted connections 114, 812, 124, 122 of the supports 810, 120. As with the compensator 100, when the fifth-wheel coupling 104 is attached to the compensator 800, the fifth-wheel coupling 104 is able to pitch relative to the mounting plate 109 about the pitch pivots 116, 126.

The compensator 800 functions according to the same kinematic principles as the compensator 100, in that the compensator 800 also comprises a four-bar link arrangement which defines a plurality of instant centres, one of which is the roll centre 230 about which the fifth-wheel coupling 104 rolls. As with the compensator 100, the compensator 800 allows the height H of the roll centre 230 above the top surface 107 of the coupler plate 105 to be varied by adjusting the spacing of or distance between the mounting pivots 812, 122 (marked as the distance D in relation to the distance between the mounting pivots 112, 122 as discussed above with examples given as D1 and D2 in FIGS. 3A and 3B, respectively).

The compensator 800 comprises an actuator 840 configured to force-control the roll movement of the fifth-wheel coupling 104 about the roll centre 230. The actuator 840 is connected to the first support 810 to move the first support 810 and/or to resist the movement of the first support 810, so as to control the roll movement of the fifth-wheel coupling 104 about the roll centre 230. The actuator 840 may be connected to the first support 810 at a rod pivot 845 disposed on the first support 810, for example through a bell crank arrangement as shown. The actuator 840 may comprise a rod 842 (or a tube or shaft) within an actuator body 843. In some embodiments, the actuator 840 is or includes a linear actuator comprising a motor 841, which drives the rod 842 to extend or retract linearly from the body 843. The linear actuator 840 may be an electric actuator capable of causing the rod 842 to extend or retract at speeds of up to 150 mm/s (millimetres per second), for example. Further, in heavy duty applications, the rod 842 may exert a force up to 100 kN when extending or retracting, for example. The extension or retraction distance of the rod 842 is designed to be sufficient to accommodate the roll or tilt angle 330 of the fifth-wheel coupling 104 in a pre-determined relative angular range, such as a range of zero to ten degrees, as measured between a perpendicular to mounting plate 109 (consistent with the global yaw axis 250 at the instant shown in FIGS. 8A to 8C) and the kingpin axis 260, shown as tilt angle 330 in FIGS. 8A and 8C.

In some embodiments, the first support 810 comprises a first link 811 and an arm 814. The first link 811 is configured to connect the mounting structure 108 and the fifth-wheel coupling 104 at the pivots 114, 812, and the arm 814 extends from the first link 811. The arm 814 is connected to the first link 811 at a proximal end 813, and includes a distal end 815 disposed opposite and remote to the proximal end 813. The arm 814 may extend from the first link 811 in a direction that is substantially perpendicular to an axis connecting the pivots 114, 812. The arm 814 may be an elongate member which is disposed at an angle measuring in the range of approximately 50° to 80° (degrees) from the axis connecting the pivots 114, 812. In such embodiments, the rod pivot 845 is disposed at the distal end 815 of the arm 814, so that actuation of the actuator 840 at the rod pivot 845 causes the arm 814 to operate as a lever. The leverage of the arm 814 on the first link 811 causes the first link 811 to rotate about pivots 114, 812, inducing roll movement of the fifth-wheel coupling 104. Similarly, roll movement of the fifth-wheel coupling 104 may cause movement of the first link 811 about pivots 114, 812, inducing movement of the arm 814 which may be absorbed or resisted by the actuator 840.

In combination with the controller 910, the actuator 840 may actively (dynamically) control the roll movement of the fifth-wheel coupling 104 about the roll centre 230 by moving the fifth-wheel coupling 104 in response to various input conditions, some of which may vary based on sensor output while the compensator 800 is in use and may be accordingly adjusted for. Input conditions that are not based on sensor output may be input into the controller 910 via display 930 (where it includes a touch-sensitive screen, for example), communicated to the controller 910 by another device, such as a communication-coupled computing device or another input mechanism, for example, and such non-sensed input conditions are then stored in the memory 914. The input conditions may include the road surface, the vehicle speed, and the characteristics of the load transported by the trailer connected to the fifth-wheel coupling 104, for example, and are discussed in more detail below.

In comparison, the limit assembly 400, 500, 600, 1200, 1300 provides passive control of the roll movement of the fifth-wheel coupling 104 about the roll centre 230 by allowing a pre-set range or amount of roll movement of the fifth-wheel coupling 104, regardless of any change in the input conditions while the compensator 800 is in use. Accordingly, while both the controller 910/actuator 840 and the limit assembly 400, 500, 600, 1200, 1300 provide control of the roll movement of the fifth-wheel coupling 104 about the roll centre 230, this control is provided in different ways, and so the controller 910/actuator 840 and the limit assembly 400, 500, 600, 1200, 1300 may be used separately to or in combination with each other, depending on the degree of roll control required. For example, in the embodiments of the active compensator 800 shown in FIGS. 8A, 8B and 8C, the actuator 840 is connected only to the first support 810 via the arm 814. The limit assembly 400, 500, 600, 1200, 1300 may act only on the second support 120 so as to reduce the likelihood of interfering with the movement of the actuator 840 and the arm 814. Alternatively, given the first and second supports 110, 120 are comparatively wider than the actuator 1210, 840 (clearly shown in FIGS. 12A and 12B, and later in FIGS. 14A and 14B), the limit assembly 400, 500, 600, 1200, 1300 may be positioned to engage with the supports 110, 120 on either side of where the actuator 1210, 840 engages with the supports 110, 120. This arrangement allows the limit assembly 400, 500, 600, 1200, 1300 to remain within the void defined underneath the coupler plate 105 and between the first and second supports 110, 120, which may improve packaging and weight distribution compared to the limit assembly 400, 500, 600, 1200, 1300 being disposed outside the void.

In some embodiments of the compensator 800, the actuator 840 provides roll control of the fifth-wheel coupling 104 without the assistance of the limit assembly 400, 500, 600, 1200, 1300 that is present in embodiments of the compensator 100. Where the actuator 840 provides roll control instead of the limit assembly 400, 500, 600, 1200, 1300 (that is, limit assembly 400, 500, 600, 1200, 1300 is not present as shown in FIGS. 8A, 8B and 8C) and the actuator 840 directly controls movement of arm 814, improved rollover stability is achieved by redirecting the overturning moment away from the vehicle unit suspension with the higher roll stiffness and distributing it more favourably between participating axle groups. This has been confirmed by sophisticated whole-of-vehicle numerical modelling.

In some embodiments, the compensator 800 comprises the fifth-wheel coupling 104, the actuator 840, and one of the limit assembly 400, 500, 600, 1200, 1300, wherein the actuator 840 operates in conjunction with the limit assembly 400, 500, 600, 1200, 1300 to control the roll movement of the fifth-wheel coupling 104. In embodiments of compensator 800 comprising the fifth-wheel coupling 104, the actuator 840, and at least one of limit assembly 400, 500, 600, 1200, 1300, improved rollover stability is achieved by combining the roll control and stabilising effects of both the actuator 840 and the limit assembly 400, 500, 600, 1200, 1300 working in unison as described herein. The combination of the actuator 840 and limit assembly 400, 500, 600, 1200, 1300 may provide capacity for controlling larger amounts of roll movement than if the actuator 840 and limit assembly 400, 500, 600, 1200, 1300 were not combined. Further, combining the actuator 840 and the limit assembly 400, 500, 600, 1200, 1300 may provide redundancy in the event that either is unable or ineffective to provide roll control of the fifth-wheel coupling 104.

FIGS. 8A and 8C show the coupler plate 105 of the fifth-wheel coupling 104 in tilted positions, wherein the coupler plate 105 has tilted or rotated away from the neutral position 200 about the neutral position roll centre 230A, for example in response to relative roll movement between the towing vehicle unit 710 and the towed vehicle unit 720. The tilted positions of the coupler plate 105 shown in FIGS. 8A and 8C are analogous to the tilted positions shown and described above in relation to FIGS. 3C and 3D. Meanwhile, FIG. 8B shows the coupler plate 105 in the neutral position 200, as shown in FIGS. 3A and 3B. The amount of tilt (leftward and/or rightward) may be restricted by the length of the rod 842; for example, the length of the rod 842 and/or at least one limiting structure defines a maximum amount of extension of the rod 842 from the actuator body 843, and a maximum amount of retraction of the rod 842 into the actuator body 843.

In FIGS. 8A to 8C, the actuator 840 is shown to be disposed between the mounting pivots 812, 122. The rod 842 extends between chassis rails or through a hole or cut out in the mounting plate 109. In some embodiments, the actuator 840 is positioned so that the linear extension or retraction of the rod is along an axis that is substantially parallel or collinear with the global yaw axis 250. This positions the actuator 840 to be located inboard of the wheels of the towing vehicle unit 710, and close to (if not coincident with) the roll axis 716 of the towing vehicle unit 710 suspension, so that the weight of the actuator 840 has reduced effect on the roll about the roll axis 716. Positioning the weight of the actuator 840 towards the ground also lowers the centre of gravity and further reduces the effect on roll about the roll axis 716. From a practical perspective, positioning the actuator 840 inboard as described also positions the actuator 840 between and/or close to various structural members 850 (such as chassis rails) of the towing vehicle unit. This facilitates secure attachment of the actuator body 843 to the towing vehicle, for example by way of actuator mount 844, so that the rod 842 is able to move linearly relative to the body 843. The actuator body 843 may be pivotally attached to the actuator mount 844 by a fixed bracket to provide an actuator mounting pivot 846. The actuator mounting pivot 846 allows for some lateral movement of the rod 842 as the rod 842 extends or retracts, relative to the mount 844. For example, when the rod 842 is connected to the rod pivot 845 and extends or retracts to move the fifth-wheel compensator 104 from side-to-side, the rod pivot 845 also moves side-to-side. The side-to-side movement of the rod pivot 845 may be along a generally arcuate path. The actuator mounting pivot 846 allows for the movement of the rod pivot 845 to be accommodated when the body 843 is connected to the mount 844. In some embodiments, the actuator 840 is disposed outside (i.e. not between) of the mounting pivots 812, 122. For example, the actuator 840 may be a rotary actuator placed at (or adjacent to) the pivot 812 along or parallel to its axis to rotate the first support 810.

When the fifth-wheel coupling 104 is tilted towards the left, as shown in FIG. 8A, the coupler plate 105 translates to the left and simultaneously rotates clockwise about the instant roll centre 230. Meanwhile, the first and second supports 810, 120 rotate in an anticlockwise direction. The anticlockwise rotation of the first support 810 causes the arm 814 to rotate in an anticlockwise direction about the pivot 812. As the rod 842 of the actuator 840 is connected to the arm 814 at the rod pivot 845, the anticlockwise rotation of the first support 810 and the arm 814 causes the rod 842 to extend from the body 843. The rate and/or amount of extension of the rod 842 from the body 843 may be controlled by the actuator 840, which may be configured to provide a resistance force to limit the extension. In embodiments of the compensator 800 where the actuator 840 causes the tilting or rotation of the fifth-wheel coupling 104, the above-mentioned steps occur in reverse. Specifically, the actuator 840 may receive a signal to extend the rod 842. The extension of the rod 842, which is connected by the rod pivot 845 to the arm 814, causes the arm 814 to rotate in an anticlockwise direction about the pivot 812. The anticlockwise rotation of the arm 814 causes anticlockwise rotation of the first support 810, which tilts the fifth-wheel coupling 104 towards the left, as shown in FIG. 8A, and the coupler plate 105 translates to the left and simultaneously rotates clockwise about the instant roll centre 230.

When the fifth-wheel coupling 104 is tilted towards the right, as shown in FIG. 8C, the coupler plate 105 translates to the right and simultaneously rotates anti-clockwise about the instant roll centre 230. Meanwhile, the first and second supports 810, 120 rotate in a clockwise direction. The clockwise rotation of the first support 810 causes the arm 814 to rotate in a clockwise direction about the pivot 812. As the rod 842 of the actuator 840 is connected to the arm 814 at the rod pivot 845, the clockwise rotation of the first support 810 and the arm 814 causes the rod 842 to retract into the body 843. The rate and/or amount of retraction of the rod 842 into the body 843 may be controlled by the actuator 840, which may be configured to provide a resistance force to limit the retraction. In embodiments of the compensator 800 where the actuator 840 causes the tilting or rotation of the fifth-wheel coupling 104, the above-mentioned steps occur in reverse. Specifically, the actuator 840 may receive a signal to retract the rod 842. The retraction of the rod 842, which is connected by the rod pivot 845 to the arm 814, causes the arm 814 to rotate in a clockwise direction about the pivot 812. The clockwise rotation of the arm 814 causes clockwise rotation of the first support 810, which tilts the fifth-wheel coupling 104 towards the right, as shown in FIG. 8C. Consequently, the coupler plate 105 translates to the right and simultaneously rotates anticlockwise about the instant roll centre 230.

In order for the actuator 840 to apply the appropriate or desired amount of force to control the roll of the towed vehicle unit 720, the actuator 840 may take into account various characteristics of the towing and towed vehicle units 710, 720 prior to actuation. The actuation of the actuator 840 may be in response to a signal received from at least one sensor, or vehicle information supplied by a controller (910, FIG. 9). At least one of the following may be used as control input to actuator control program 916 (FIG. 9) in order to control the actuator 840: speed and lateral acceleration of the towing and towed vehicle units 710, 720; axle group loads at the towed vehicle unit's axles, steer angle of the steering wheels (usually at the front axle of the prime mover 710); load on the fifth-wheel coupling 104; and overturning moment imposed on the fifth-wheel coupling 104. Output signals from existing vehicle systems, such as the braking system (ABS/EBS), roll-stability systems (RSC, ESP, ESC, if equipped), and airbag pressures (on-board pressure sensors or load weighing systems) may be used by the actuator control program 916 to generate the necessary signals or information for control of the actuator 840. Where such signals or information is not able to be supplied by existing vehicle systems, a load sensing arrangement can be installed on the fifth-wheel coupling 104. For example, strain gauges may be installed on the left and right side of the fifth-wheel coupling 104 to measure the overturning moment imposed by left-side to right-side (and vice versa) transfer of the load carried by the towed vehicle unit 720.

Figure 14A:
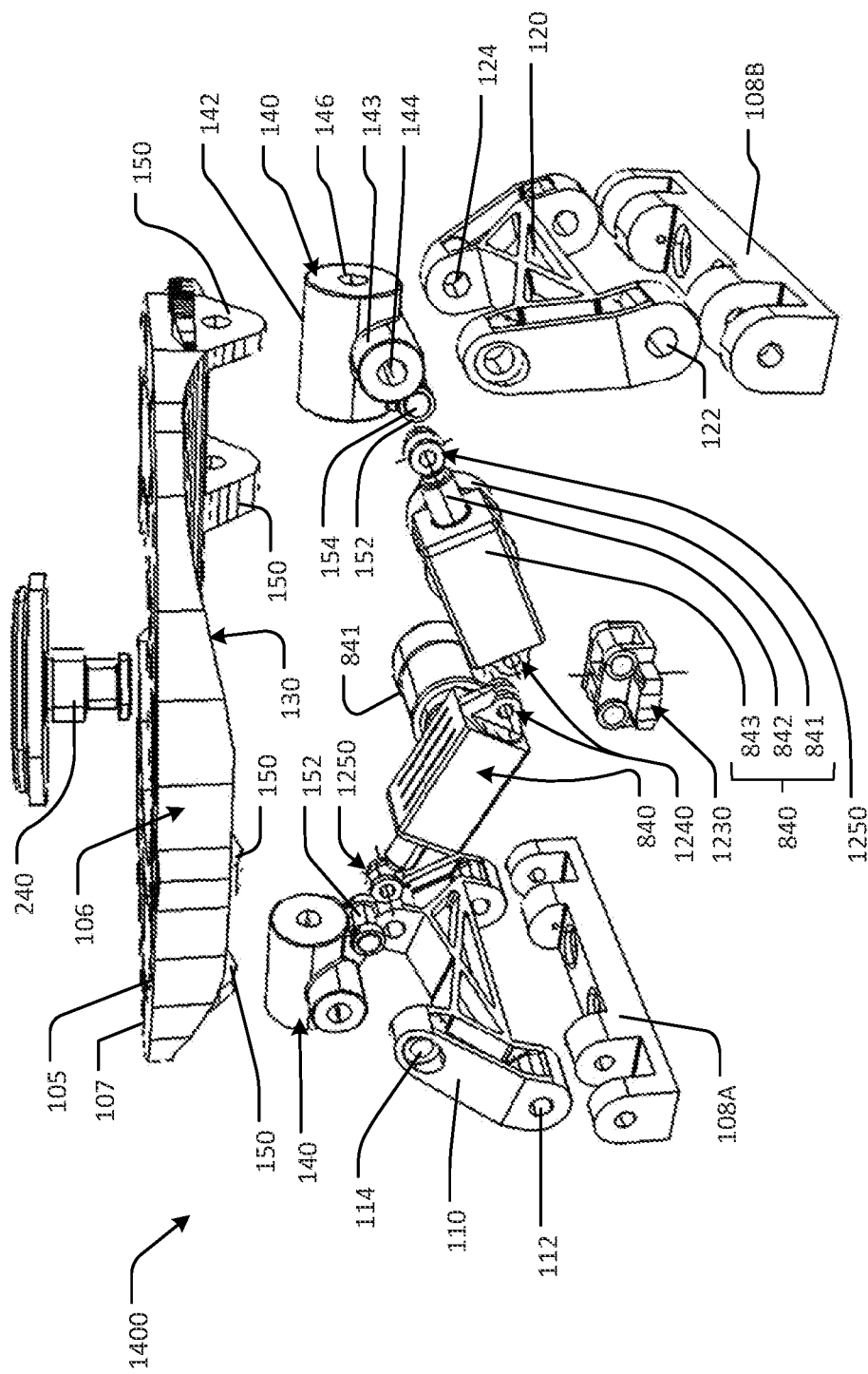
FIG. 14A is an exploded view of an automatically-compensated fifth-wheel coupling, according to some embodiments.

FIG. 14A is an exploded view showing a further embodiment of an automatic compensator 1400 for compensating the roll movement of the fifth-wheel coupling 104 by using active movement control. The automatic compensator 1400 is disposed in the void defined underneath the coupler plate 105 and between the first and second supports 110, 120. The automatic compensator 1400 is configured to cooperate with the automatic compensation system 900 in the same way as the compensator 800.

In some embodiments, the automatic compensator 1400 comprises the actuator 840, which as per the embodiments previously described in relation to FIGS. 8A, 8B, 8C is configured to force-control the roll movement of the fifth-wheel coupling 104 about the roll centre 230. In the embodiments of FIGS. 8A, 8B, 8C, the actuator 840 is directly connected to the first support 810 via the arm 814. In contrast, embodiments of the automatic compensator 1400 comprise the actuator 840 indirectly connected to the first support 110 via the trunnion 140. A pin or bolt may be used to pivotally connect the rod pivot 845 (of the actuator 840) to the connector 152 (of the trunnion 140), in the same manner that a pin or bolt may be used to pivotally connect the second end portion 1250 (and damper 1212) to the trunnion 140 in relation to the aforementioned embodiments relating to those shown in FIGS. 12A, 12B and 13. In some embodiments, the trunnion 140 comprises a plurality of the connector 152 so as to allow both the actuator 840 and the limit assembly 400, 500, 600, 1200, 1300 to attach to the trunnion 140.

The automatic compensator 1400 may further comprise the base mount 1230. In some embodiments, the actuator 840 further comprises the first end portion 1240. The first end portion 1240 allows the actuator 840 to be connected to the base mount 1230 (for example, by the coupling pin 1236). Accordingly, embodiments of the automatic compensator 1400 comprise the actuator 840 connected to the base mount 1230 at a first end of the actuator 840, and connected to the trunnion 140 at an opposite second end of the actuator 840. The actuator 840 is thereby configured to move the first support 110 and/or to resist the movement of the first support 110, so as to control the roll/tilt movement of the fifth-wheel coupling 104 about the roll centre 230. Specifically, rolling or tilting movement of the coupler plate 105 may be controlled by activating the motor 841 to extend or compress/retract the rod 842 of the actuator 840.

In some embodiments of the compensator 1400, only one unit of the actuator 840 is present. In some embodiments of the automatic compensator 1400, two units of the actuator 840 are present. One actuator 840 is connected to the trunnion 140 associated with the first support 110, while the other actuator 840 is connected to the other trunnion 140 associated with the second support 120.

The two actuators 840 cooperate to control the tilting movement of the coupler plate 105, wherein when one of the actuator 840 is retracted, the other one of the actuator 840 is extended. Use of a single actuator 840 is possible since the same actuator 840 can be used to control, limit or resist movement of the first support 110 or the second support 120 in both lateral directions, since the actuator 840 is connected, coupled or anchored to both the support 110 or 120 and the mounting platform 109 (via base plate 1232). Use of a single actuator 840 may take up less space overall than two actuators 840 and may involve lower cost, when considering the other components required for attaching the actuator 840 to the coupler plate 105. However, the provision of two actuators 840 may allow each individual actuator 840 to be smaller than a single larger actuator 840. The provision of two actuators 840 also provides redundancy in the event of failure of one of the actuators 840.

Figure 14B:
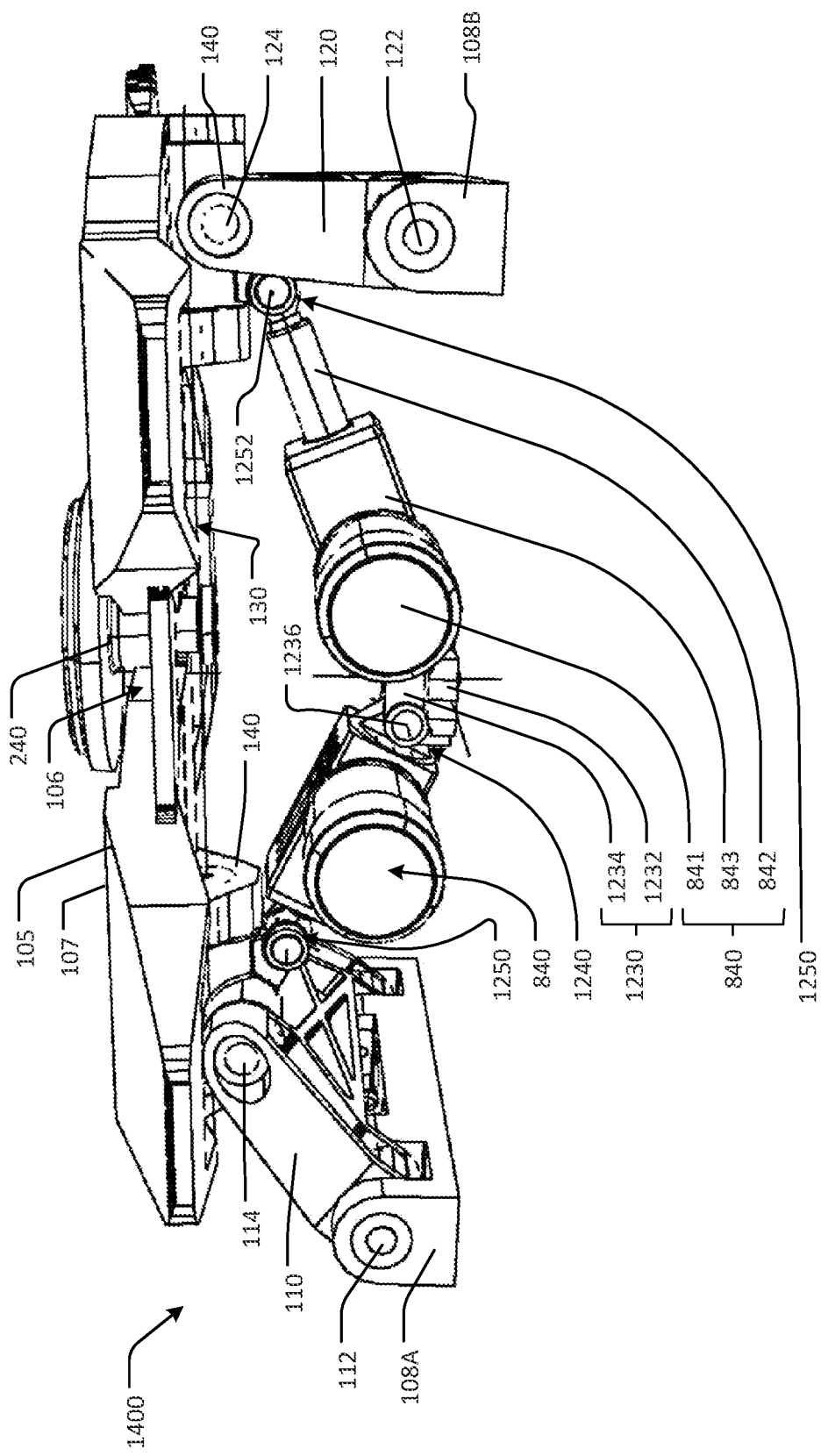
FIG. 14B is a reverse perspective view of the automatically-compensated fifth-wheel coupling of FIG. 14A, as assembled with one actuator fully extended and the other actuator full-retracted.

FIG. 14B is a reverse perspective view of the automatic compensator 1400 shown in FIG. 14A, as assembled. The actuator 840 is a compact unit so as to avoid restricting the movement of the supports 110, 120, as the void underneath the coupler plate 105 may be quite small.

FIGS. 14A and 14B show the actuators 840 arranged diagonally. In use, the actuators 840 extend from the base mount 1230 located approximately midway between the supports 110, 120 and connect to the trunnion 140 located at an upper part of the supports 110, 120. In some embodiments, the actuators 840 are instead horizontal. In some embodiments, the actuators 840 may be aligned with the long axis of the vehicle (parallel to the vehicle's roll axis), or perpendicular to the long axis of the vehicle. When horizontal, the actuators 840 may be positioned towards a lower part of the supports 110, 120, adjacent to, below, or in contact with the mounting plate 109.

When the actuators 840 are horizontal, the compensator 1400 may further comprise a push rod and bell crank arrangement, wherein the rod pivot 845 comprises at least one push rod and at least one bell crank connected to each other to transfer extension and retraction/compression of the actuator 840 into roll of the coupling 104. For example, the rod pivot 845 may be connected via a first bell crank to a push rod. This push rod may extend toward and connect to the trunnion 140, so that extension or compression/retraction of the rod 842 moves the trunnion 140 to tilt or roll the coupler plate 105. The push rod may be connected to the trunnion 140 via a second bell crank.

The arrangement of push rod(s) and bell crank(s) may allow the actuators 840 to occupy less space directly between the supports 110, 120, which may allow for a lower position of the coupler plate and/or a greater range of roll of the coupling 104 to be controlled, compared to the embodiment shown in FIGS. 14A and 14B, for example. The arrangement of push rod(s) and bell crank(s) may allow the actuators 840 to be larger with greater load capacity for heavy duty applications; in other applications it may allow better packaging of components. In some embodiments actuator 840 may be hydraulic.

In some embodiments, the actuator 840 may be an electric actuator. A suitable electric actuator may be supplied by actuator manufacturers such as Moog and Festo. The actuator stroke specification and speed/force relationship will be specific to the type and size of vehicle, as well as specific to the compensator design. The location and configuration of the actuator (for example, parallel to the roll axis of the vehicle, or angled as per FIGS. 14A and 14B) will also affect the actuator stroke and the other operating characteristics of the actuator. Other considerations include the choice of electric actuators or hydraulic actuators. Compared to electric actuators, hydraulic actuators generally produce more force in a smaller package, but the presence of high-pressure hydraulic fluid requires secondary equipment such as pumps, accumulators, pipes, valving and controllers, oil reservoirs and filters to store and communicate the hydraulic fluid, which increases maintenance.

As previously described, the actuator 840 in combination with the controller 910 may actively (dynamically) control the roll movement of the fifth-wheel coupling 104 about the roll centre 230 by moving the fifth-wheel coupling 104 in response to various input conditions. Some of these input conditions may vary based on sensor output while the compensator 800, 1400 is in use and may be accordingly adjusted for.

For example, the controller 910 may take into account the following input conditions, and adjust the actuator(s) 840 accordingly.

Vehicle speed, low/high-speed modes: This may involve input from various sensors, such as from the sensors 932, 934, 936, 940;

Integration with other on-board systems: Roll Stability Control (RSC/RSS) and Electronic Stability Control (ESC/ESP).

GPS data and preview: When the vehicle's route is mapped using GPS and its location known, a computer system notes the road geometry (e.g. camber, corner radii) based on the route being taken and provides this data to the controller 910. The controller 910 may then pre-emptively adjust the actuator(s) 840 based on the GPS position of the vehicle along the designated route, in view of the road geometry at that location.

Laden/unladen state and centre-of-gravity: System detects whether the vehicle is fully laden, partially laden or unladen, and determines the centre of gravity height when laden. This may be determined using the RSC/RSS systems. The controller 910 may then adjust the actuator(s) 840 to apply the appropriate/required amount of roll compensation.

The trunnion 140, base mount 1230, and rod end bearings 1242, 1252 enable the interchangeability of parts to switch between passive roll compensation and active roll compensation. For example, the damper 1212 can be exchanged for the actuator 840, thereby converting the passive compensator of FIGS. 12A, 12B and 13 to the active compensator of FIGS. 14 and 15. The interchangeability of parts may allow for a "plug and play" arrangement, providing drivers/operators with convenience and easier maintenance. The modular design may further provide reduced operating and maintenance costs, as faulty individual parts can be replaced rather than requiring the entire compensator 100, 800, 1400 to be replaced.

Figure 9:
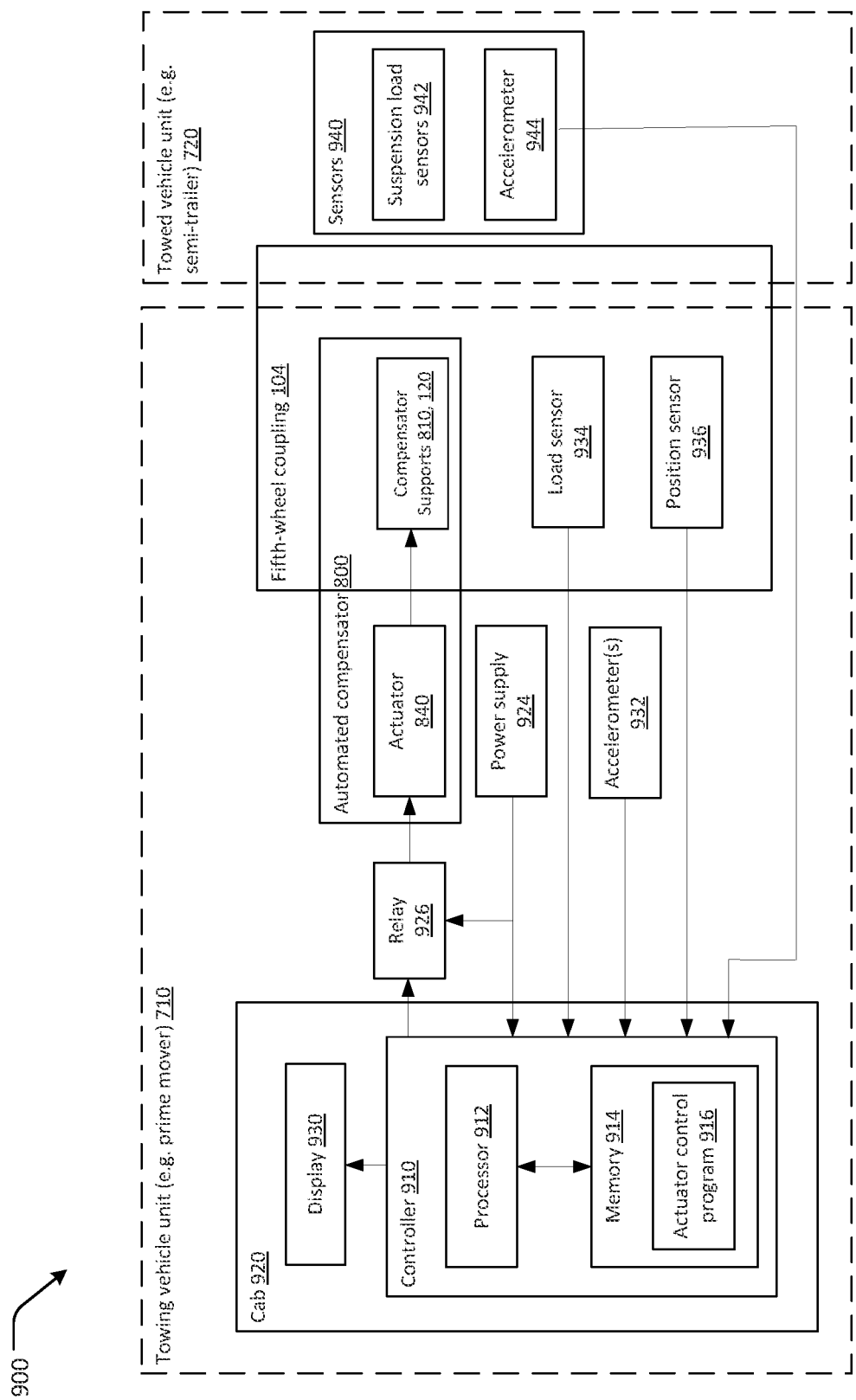
FIG. 9 is a block diagram showing a system for automatically compensating roll movement of a combination vehicle comprising a towing vehicle unit and a towed vehicle unit, the system comprising the automatically-compensated fifth-wheel coupling of FIGS. 8A to 8C.

FIG. 9 is a block diagram of an automatic compensation system 900 for automatically compensating the roll movement of the combination vehicle 700 comprising the towing vehicle unit 710 and the towed vehicle unit 720. The system 900 comprises the automatic compensator 800 connected to the fifth-wheel coupling 104 as shown in FIGS. 8A to 8C, which connects the towing and towed vehicle units 710, 720. The compensator 800 responds to inputs from a controller 910. The controller 910 receives information such as sensor data from at least one sensor. The at least one sensor may be one of a plurality of sensors each sensing a parameter relevant to determining whether roll compensation is required for the vehicle. The plurality of sensors may each sense a parameter on any vehicle unit of the vehicle, such as the towing unit (rigid truck or prime mover) or the towed unit (a semi-trailer or converter dolly). For example, at least one accelerometer 932 records and transmits acceleration data (relating to the towing vehicle unit 710) to the controller 910. The controller 910 may also receive load data (relating to load on the fifth-wheel coupling 104) from a load sensor 934, and position data (relating to the position of the fifth-wheel coupling 104) from a position sensor 936. The load sensor 934 and position sensor 936 may be attached to the fifth-wheel coupling 104.

The controller 910 may also receive sensor data from sensors 940 disposed on the towed vehicle unit 720. The sensors 940 comprise suspension load sensors 942, suspension height sensor (not shown), vehicle speed (not shown) and an accelerometer 944 (lateral or sideways acceleration). The load carried by the towed vehicle unit 720 is transferred to the towed vehicle unit's suspension, and is thereby detected by the suspension load sensors 942. The suspension load sensors 942 may also provide information regarding the road surface, such as unevenness which may impart a load to the towed vehicle unit's suspension. In a similar manner to the accelerometer 932, the accelerometer 944 records and transmits acceleration data relating to the towed vehicle unit 720 to the controller 910.

The controller 910 comprises a processor 912 in communication with memory 914. The memory 914 stores program code executable to implement an actuator control program 916, which when executed by the processor 912, cause the processor 912 to process all the sensor data, including data received from the sensors 932, 934, 936, 940 and generate control signals to output to actuator 840 and/or relay 926 for controlling supply of power to and operation of the actuator. Controller 910 further includes components and circuits configured to condition and process input and output signals. For example, the actuator control program 916 may contain program instructions executable (in combination with other circuits and components) to perform signal conditioning, de-noising and/or analog-to-digital conversion of the signals and the sensor data, including data received from the sensors 932, 934, 936, 940. In addition to processing the data for display the driver inside the cab 920, the processor 912 provides instructions for the automated compensator 800 to control the roll movement of the fifth-wheel coupling 104. The controller 910 transmits control signals generated by the processor 912 to the automated compensator 800 via a relay 926. The relay 926 is configured to switch power from a power supply 924 to the actuator 840. The relay 926 is controllable by the controller 910 to vary the supply of current from the power supply 924 so that the actuator 840 can operate to extend or retract the rod 842 as required. The controller 910 and the actuator 840 are powered by the power supply 924, such as a battery or solar panel. The power supply 924 may receive power from or be part of the towing vehicle unit's own electricity supply.

In some embodiments, the towing vehicle unit 710 is a prime mover comprising a driver's cab 920, and the controller 910 is mounted in or on the cab 920 and may provide information to the driver via a display or panel 930, for example. The relay 926 may be positioned on or in the cab 920, may be carried external of the cab 920 or may be positioned adjacent to the actuator 840, for example.

In some embodiments, the compensator 800 is calibrated before it is installed with the fifth-wheel coupling 104 on the towing vehicle unit 710. In some embodiments, the compensator 800 is not calibrated prior to installation with the fifth-wheel coupling 104 on the towing vehicle unit 710, and the compensator 800 may automatically calibrate itself based on sensor data (such as from the sensors 932, 934, 936, 940) collected within a time window after the towed vehicle unit 720 is connected to the towing vehicle unit 710. Calibration may involve the compensator 800 being adjusted to suit the characteristics of the towing and towed vehicle units 710, 720 (such as vehicle suspension characteristics), as well as the load carried by either or both of the vehicle units 710, 720. For example, the calibration process may measure the centre of gravity 730 of the load and as a result, adjust the height H of the roll centre 230 so that the roll axis 728 sits above the centre of gravity 730. Alternatively, the roll axis 728 may be adjusted to sit below the centre of gravity 730, and the actuator 840 may be configured to control the roll movement of the fifth-wheel coupling 104 by tilting the fifth-wheel coupling 104 in the opposite direction to an arrangement where the roll axis 728 sits above the centre of gravity 730. Further, the height of the roll axis location may be at a fixed height and actuator 840 configured to control the roll movement of the fifth wheel coupling 104 by tilting the fifth wheel coupling in the required direction responding appropriately to the prevailing conditions and to where the centre of gravity sits, above or below, roll axis 728. The calibration process may also result in adjustment of the rate and amount of travel of the actuator 840, so that in use, any roll compensation by the compensator 800 is suited to the vehicle units 710, 720, and does not adversely affect the dynamics of vehicle 700 while in motion.

The driver may be required to perform some of the calibration process after connecting the towed vehicle 720 to the fifth-wheel coupling 104, but prior to beginning driving. In some embodiments, the level of automation and driver involvement can be customised, ranging from lots of driver involvement to very little or no driver involvement. Where no driver involvement is required, the controller 910 assumes full responsibility for the necessary checks and system status at start-up before driving off. The controller 910 may perform further checks after a short distance of travel, activate braking systems (ABS/EBS) continuously or intermittently as required, such that the vehicle units 710, 720 have travelled sufficiently during the time window to perform the calibration process as described above. For example, the load sensors 934, 942 may sense the current load and the actuator control program may determine the height of the load's centre of gravity 730 based on the output of load sensors 934, 942. When the system 900 has completed calibration, the driver may receive a message on the display 930 indicating that the compensator 800 has been calibrated to suit the load carried.

In some embodiments, the controller 910 provides ongoing calibration during use (while the vehicle 700 is travelling), so that changes in the load condition are accounted for. Such changes may include instances where the load is a loose substance that is likely to move during transport (for example, a viscous liquid, or granular material), including livestock loads (animals or animal carcasses) and/or loosely packed objects (general freight and palletised loads), and thereby result in movement of the location of the centre of gravity 730. In the event of a lateral shift of the load or change of the load condition, the controller 910 may provide the driver with some feedback or a warning via the display 930 and may automatically adjust the tilt of the coupler plate thereby compensating in-whole or in-part for a sideways (lateral) load shift.

Figure 10:
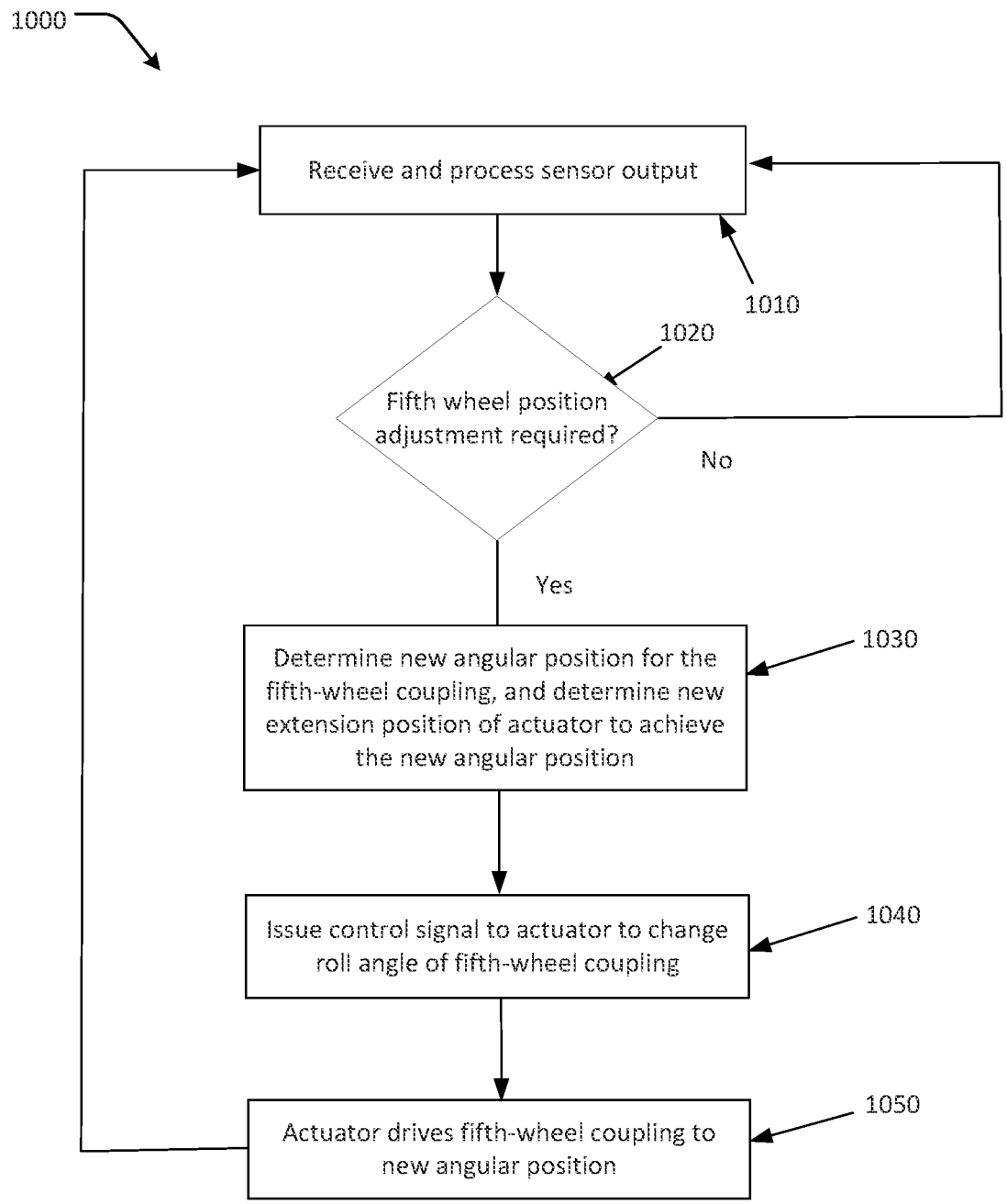
FIG. 10 is a flow chart of a process for operation of the automatically-compensated fifth-wheel coupling of FIGS. 8A to 8C.

FIG. 10 shows a flowchart of a process 1000 for operation of the automatic compensator 800 as shown in FIGS. 8A to 8C. The process 1000 may be performed by controller 910 (and actuator 840) by execution of the actuator control program 916 stored in memory 914 so as to instruct the compensator 800 to control the roll movement of the fifth-wheel coupling 104. The process 1000 comprises various steps or processes, such as 1010, 1020, 1030, 1040 that are performed continuously and/or repeatedly while the vehicle 700 is powered on.

At 1010, sensor output (such as sensor data from the sensors 932, 934, 936, 940) is received and processed by the controller 910. At 1020, the actuator control program 916 determines whether the position of the fifth-wheel coupling 104 needs to be adjusted, based on the sensor data received by the controller 910 at step 1010. The control program 916 may determine that the position of the fifth-wheel coupling 104 only needs to be adjusted when the sensor output exceeds a predetermined threshold. For example, if the sensor output would result in a change in the angular position of the fifth-wheel coupling 104 less than the threshold, for example less than 0.5 degrees, the actuator control program 916 may determine that no adjustment is necessary. This reduces the likelihood of the automatic compensator 800 responding to minor changes in the centre of gravity location.

If adjustment of the fifth-wheel coupling 104 is not necessary, the actuator control program 916 reverts to step 1010 and repeats step 1020 based on new sensor output. If adjustment of the fifth-wheel coupling 104 is necessary, the actuator control program 916 proceeds to step 1030.

At 1030, having determined that adjustment of the fifth-wheel coupling 104 is necessary, the actuator control program 916 determines a new angular position for the fifth-wheel coupling 104. The actuator control program 916 then determines a new extension position for rod 842 in order to achieve the determined new angular position for the fifth-wheel coupling. Determination of the new angular position and new extension position may be by referencing a lookup table stored in memory 914 or by feeding the various sensor outputs into a predetermined (pre-stored) calculation executed by the processor 912, for example. At 1040, the actuator control program 916 then issues a control signal to the actuator 840 to change the rod 842 extension position, which causes a change in the roll angle 330 of the fifth-wheel coupling 104. Depending on the determined new angular position, the control signal may cause the actuator to extend or retract the rod 842 from the actuator body 843 so as to tilt the fifth-wheel coupling 104 as described above in relation to FIGS. 8A to 8C. At 1050, the actuator 840 drives the rod 842 to tilt the fifth-wheel coupling 104 as shown in FIGS. 8A and 8C.

Figure 11:
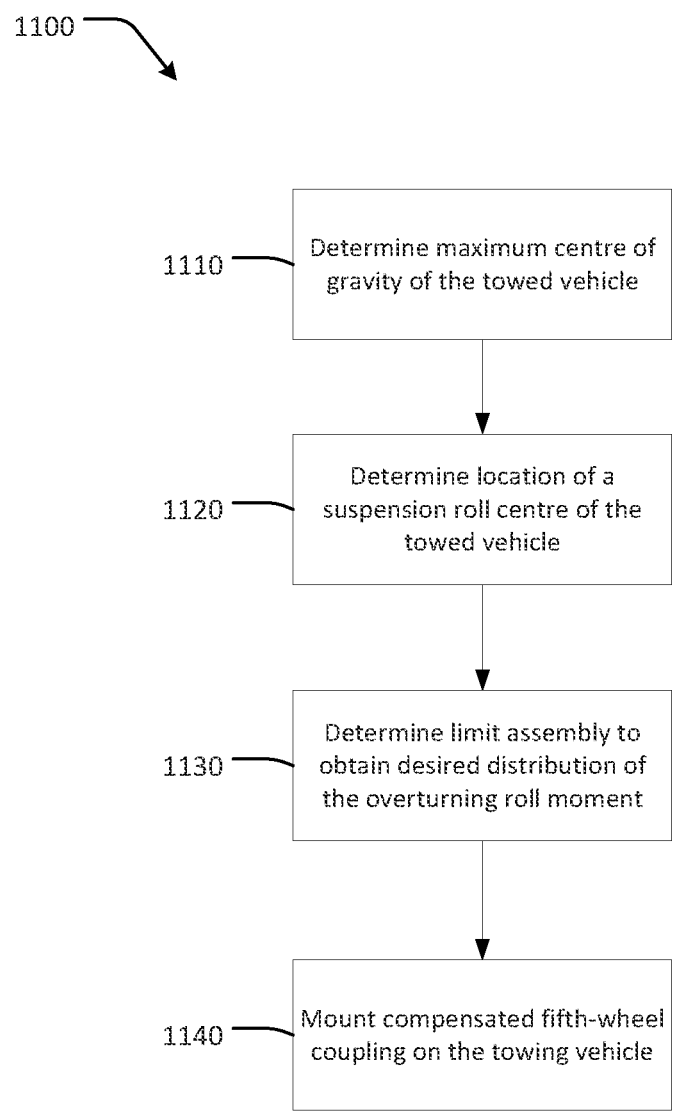
FIG. 11 is a block diagram of a method of allowing for compensation of body-roll transferred from a towed vehicle unit when connected to a towing vehicle unit, using the automatically-compensated fifth-wheel coupling of any one of FIGS. 8A to 8C.

FIG. 11 shows a method 1100 of allowing for compensation of body-roll transferred from a towed vehicle unit when connected to a towing vehicle unit by a fifth-wheel coupling 104 using the compensator 800. The towed vehicle unit may be the semi-trailer 720, and the towing vehicle unit may be the prime mover 710, for example. The method 1100 comprises the step of determining a maximum height of the centre of gravity of the towed vehicle unit, at 1100. Determining the maximum height of the centre of gravity is determined based on the towed vehicle unit being maximally loaded with the material or cargo that it is designed to carry. In most cases, the towed vehicle unit will not be maximally loaded, so the actual height of the centre of gravity may be less than the maximum. If the roll axis is designed to be above the maximum height of the centre of gravity, then for lesser loads in the towed vehicle unit during use, the roll axis can be assured to be above the actual height of the centre of gravity.

The method 1100 further comprises the step of determining a location of a suspension roll centre of the towed vehicle unit, at 1120. The suspension roll centre of the towed vehicle unit may be the third suspension roll centre 722. The method 1100 further comprises the step of determining the absorptive or resistive characteristics of the limit assembly required to achieve the desired distribution of the overturning roll moment between the towing and towed vehicle units' participating axle groups, at 1130. At least one of the steps 1110, 1120, 1130 may involve numerical modelling or calculation. For example, the modelling or calculation for step 1130 may comprise considering the spacing D of the pivots 812, 122, and the height H of the roll centre 230. The method 1100 further comprises the step of mounting on the towing vehicle unit the compensated fifth-wheel coupling 104 with the desired roll centre and limit assembly characteristics, at 1140. The roll centre 230 defined by the first and second axes 210, 220 of the compensated fifth-wheel coupling 104 is selected to position (via the controller 910) the towed vehicle unit roll axis 728 adjacent to, above, or below the height of the maximum centre of gravity. The towed vehicle unit roll axis 728 is defined by the roll centre 230 and the suspension roll centre 722, as described above.

The compensators 100, 800 and 1400 reduce the need for large amounts of lubrication as required for existing compensated fifth-wheel couplings and would be expected to have smoother and better performance, less maintenance and longer operating life. The compensators 100, 800 and 1400 provide means for adjusting the roll centre and therefore the roll axis, to better suit the load carried by the towed vehicle units, compared to existing compensated fifth-wheel couplings which have a roll centre at a fixed height, for example 1 m, and do not take into consideration the specific mechanical properties of the participating axle groups and location of the roll axis. The compensators 100, 800 and 1400 have few moving parts and a simple kinematic arrangement, which means a reduced risk of breakdown compared to existing compensated fifth-wheel couplings with complex configurations of moving parts. The compensators 100, 800 and 1400 provide roll compensation of the towed vehicle unit as the articulated vehicle travels at low speeds (speeds up to approximately 30 km/h) over uneven terrain. Furthermore, as the articulated vehicle travels at higher speeds (speeds greater than approximately 30 km/h), the stability of the towed vehicle unit against rollover is improved compared to conventional compensated fifth-wheel couplings or uncompensated fifth-wheel couplings.

The aforementioned embodiments of the compensators 100, 800 and 1400 control the amount of roll transferred to the towing vehicle unit 710 via the fifth-wheel coupling 104 by having supports 110, 120 and 810, 120 respectively which move in response to the roll movement of the towed vehicle unit 720. The movement of the supports 110, 120 and 810, 120 provides passive and active roll compensation systems, respectively, wherein the compensators 100 and 800 are dependent on reacting to the movement of the suspension and/or the movement of the trailer 720, and signals from one or more sensors.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. An automated compensation system for a fifth-wheel coupling mounted on a towing vehicle unit, the system comprising:
    a first pivoting support to support one lateral side of the fifth-wheel coupling;
    a second pivoting support to support an opposite lateral side of the fifth-wheel coupling;
    an actuator configured to cause movement of the first and second pivoting supports;
    a sensor configured to sense a parameter relevant to determine whether roll compensation is required; and
    a controller configured to receive a sensor output of the sensor and to determine whether roll compensation is required based on the sensor output, the controller being further configured to issue a control signal to cause the actuator to move the first and second pivoting supports when the controller determines that roll compensation is required,
    wherein the actuator is configured to cause lateral tilt of the fifth-wheel coupling of up to about 10°.

2. An automated compensation system for a fifth-wheel coupling mounted on a towing vehicle unit, the system comprising:
    a first pivoting support to support one lateral side of the fifth-wheel coupling;
    a second pivoting support to support an opposite lateral side of the fifth-wheel coupling;
    an actuator configured to cause movement of the first and second pivoting supports;
    a sensor configured to sense a parameter relevant to determine whether roll compensation is required; and
    a controller configured to receive a sensor output of the sensor and to determine whether roll compensation is required based on the sensor output, the controller being further configured to issue a control signal to cause the actuator to move the first and second pivoting supports when the controller determines that roll compensation is required,
    wherein the control signal is based on output from the sensor, the sensor configured to provide vehicle information associated with the towing vehicle unit and one or more towed vehicle unit(s) connected to the fifth-wheel coupling.

3. The system of claim 2, wherein the actuator is configured to cause movement of the first and second pivoting supports by generating a moment about a pivot on or adjacent a mounting platform of the towing vehicle unit.

4. The system of claim 2, wherein the actuator is disposed between the first and second pivoting supports.

5. The system of claim 2, wherein the sensor is one of a plurality of sensors each sensing a parameter relevant to determining whether roll compensation is required for a vehicle comprising the towing vehicle unit and the one or more towed vehicle unit(s).

6. The system of claim 5, wherein the plurality of sensors includes: (i) at least one accelerometer; and/or (ii) at least one load sensor.

7. The system of claim 2, further comprising a position sensor to provide a signal to the controller indicative of: (i) a position of the actuator; or (ii) a position of the fifth-wheel coupling.

8. The system of claim 2, further comprising a limit assembly configured to exert a force or moment, directly or indirectly, on at least one of the first and second pivoting supports to restrict movement of the supports.

9. The system of claim 2, further comprising:
    a first trunnion, wherein the first pivoting support is pivotally connected to the first trunnion to define a first roll pivot; and a second trunnion, wherein the second pivoting support is pivotally connected to the second trunnion to define a second roll pivot;

wherein the first and second trunnions are pivotally connected to the fifth-wheel coupling at respective first and second pitch pivots;

wherein the first and second pitch pivots are coaxial, and perpendicular to the first and second roll pivots; and wherein the actuator indirectly exerts a force or moment to the first and second supports, through the first and second trunnions respectively, to cause movement of the supports.

10. The system of claim 2, wherein the actuator is an electric actuator comprising a motor, wherein the motor is configured to extend or retract a rod of the actuator relative to a body of the actuator, or rotate a rod, tube, or shaft relative to a body of the actuator.

11. The system of claim 9, wherein the actuator comprises a first end portion disposed at a first end of the actuator, wherein the first end portion pivotally connects the actuator to a base mount connected to the mounting platform.

12. The system of claim 11, wherein the actuator further comprises a second end portion disposed at an opposite second end of the actuator, wherein the second end portion pivotally connects the actuator to at least one of the roll pivots via the first trunnion or the second trunnion.

13. The system of claim 8, wherein the limit assembly comprises a first elastically deformable limit member, and wherein an applied force causing movement of each of the supports moves the supports so that at least one of the supports engages with the first elastically deformable limit member to direct at least part of the applied force through the first elastically deformable limit member.

14. The system of claim 13, wherein the limit assembly comprises a second elastically deformable limit member, the second elastically deformable limit member connected to the first elastically deformable limit member so that at least part of the applied force transmitted through the first elastically deformable limit member is transmitted through the second elastically deformable limit member.

15. The system of claim 14, wherein the first and second elastically deformable limit members are connected in series, and the second elastically deformable limit member is connected to the towing vehicle unit.

16. A towing vehicle unit having a fifth wheel coupling, the fifth wheel coupling being carried on the first and second pivoting supports of the automated compensation system of claim 2, the first and second pivoting supports being mounted on a mounting platform of the towing vehicle unit.

17. An articulated vehicle comprising a towing vehicle unit and a towed vehicle unit, the articulated vehicle comprising a fifth-wheel coupling and the automated compensation system of claim 2, wherein the roll centre of the fifth-wheel coupling and a suspension roll centre of the towed vehicle unit define a towed vehicle unit roll axis adjacent to or above a centre of gravity of the towed vehicle unit.

18. The system of claim 2, wherein the controller is configured to adjust the actuator based on a GPS position of the towing vehicle unit.

19. An automated compensation system for a fifth-wheel coupling mounted on a towing vehicle unit, the system comprising:

a first pivoting support to support one lateral side of the fifth-wheel coupling;

a second pivoting support to support an opposite lateral side of the fifth-wheel coupling;

an actuator configured to cause movement of the first and second pivoting supports;

a sensor configured to sense a parameter relevant to determine whether roll compensation is required;

a controller configured to receive a sensor output of the sensor and to determine whether roll compensation is required based on the sensor output, the controller being further configured to issue a control signal to cause the actuator to move the first and second pivoting supports when the controller determines that roll compensation is required; and a limit assembly configured to exert a force or moment, directly or indirectly, on at least one of the first and second pivoting supports to restrict movement of the supports.

20. The system of claim 6, wherein the at least one accelerometer comprises a first accelerometer and a second accelerometer each configured to record and transmit acceleration data to the controller; and wherein the at least one load sensor comprises a first load sensor and a second load sensor each configured to measure a fifth-wheel coupling load or to measure a vehicle suspension load and/or deflection.

* * * * *